(12) United States Patent
Yuan et al.

(10) Patent No.: US 10,768,286 B2
(45) Date of Patent: Sep. 8, 2020

(54) METHOD AND SYSTEM FOR MEASURING A CHARACTERISTIC LOOP SENSITIVITY FOR AN ACOUSTIC TRANSDUCER

(71) Applicant: BROADSOUND CORPORATION, Jhubei, Hsinchu County (TW)

(72) Inventors: Ying-Wei Yuan, Jhubei (TW); Fu-Chieh Yang, Hsinchu (TW); Jen-Chih Yao, Qionglin Township, Hsinchu County (TW); Yi-Lung Yu, Jhubei (TW)

(73) Assignee: BROADSOUND CORPORATION, Jhubei, Hsinchu County (TW)

( * ) Notice: Subject to any disclaimer, the term of this patent is extended or adjusted under 35 U.S.C. 154(b) by 418 days.

(21) Appl. No.: 15/855,710

(22) Filed: Dec. 27, 2017

(65) Prior Publication Data
US 2019/0195995 A1   Jun. 27, 2019

(51) Int. Cl.
| | | |
|---|---|---|
| *G01S 7/52* | (2006.01) | |
| *G01S 15/89* | (2006.01) | |
| *G01N 29/30* | (2006.01) | |
| *G01S 7/523* | (2006.01) | |
| *G01N 29/34* | (2006.01) | |
| *G01N 29/46* | (2006.01) | |

(52) U.S. Cl.
CPC .............. *G01S 7/523* (2013.01); *G01N 29/30* (2013.01); *G01N 29/343* (2013.01); *G01N 29/46* (2013.01); *G01S 7/52004* (2013.01); *G01S 15/89* (2013.01)

(58) Field of Classification Search
CPC ...... G01N 29/30; G01N 29/343; G01N 29/46; G01S 7/52004; G01S 15/89
See application file for complete search history.

(56) References Cited

U.S. PATENT DOCUMENTS

| | | | | |
|---|---|---|---|---|
| 8,742,768 B1 * | 6/2014 | Pelletier | ................. | G01N 22/04 324/617 |
| 2006/0114034 A1 * | 6/2006 | Kawano | ................. | H03M 5/18 327/100 |
| 2009/0290452 A1 * | 11/2009 | Lyon | ................... | G01F 23/2962 367/99 |

OTHER PUBLICATIONS

Gomez et al., "Ferroelectret Transducers for Water Immersion and Medical Imaging", 2016, IEEE International Ultrasonics Symposium Proceedings, 4pp.

* cited by examiner

*Primary Examiner* — Ian J Lobo
(74) *Attorney, Agent, or Firm* — Hauptman Ham, LLP

(57) ABSTRACT

A method and system is disclosed for measuring a characteristic loop sensitivity ($S_{LC}$) for an acoustic transducer. A pulse signal is employed as a wideband reference signal $V_r(t)$; and, in a pulse-echo measurement a corresponding wideband echo signal $V_e(t)$ is obtained. A characteristic loop sensitivity ($S_{LC}$) for the acoustic transducer is defined as a ratio of an energy density of $V_e(t)$ to an energy density of $V_r(t)$ in decibel, in which the energy density of a given signal is calculated as a ratio of an energy of the signal to a bandwidth of the signal.

5 Claims, 18 Drawing Sheets

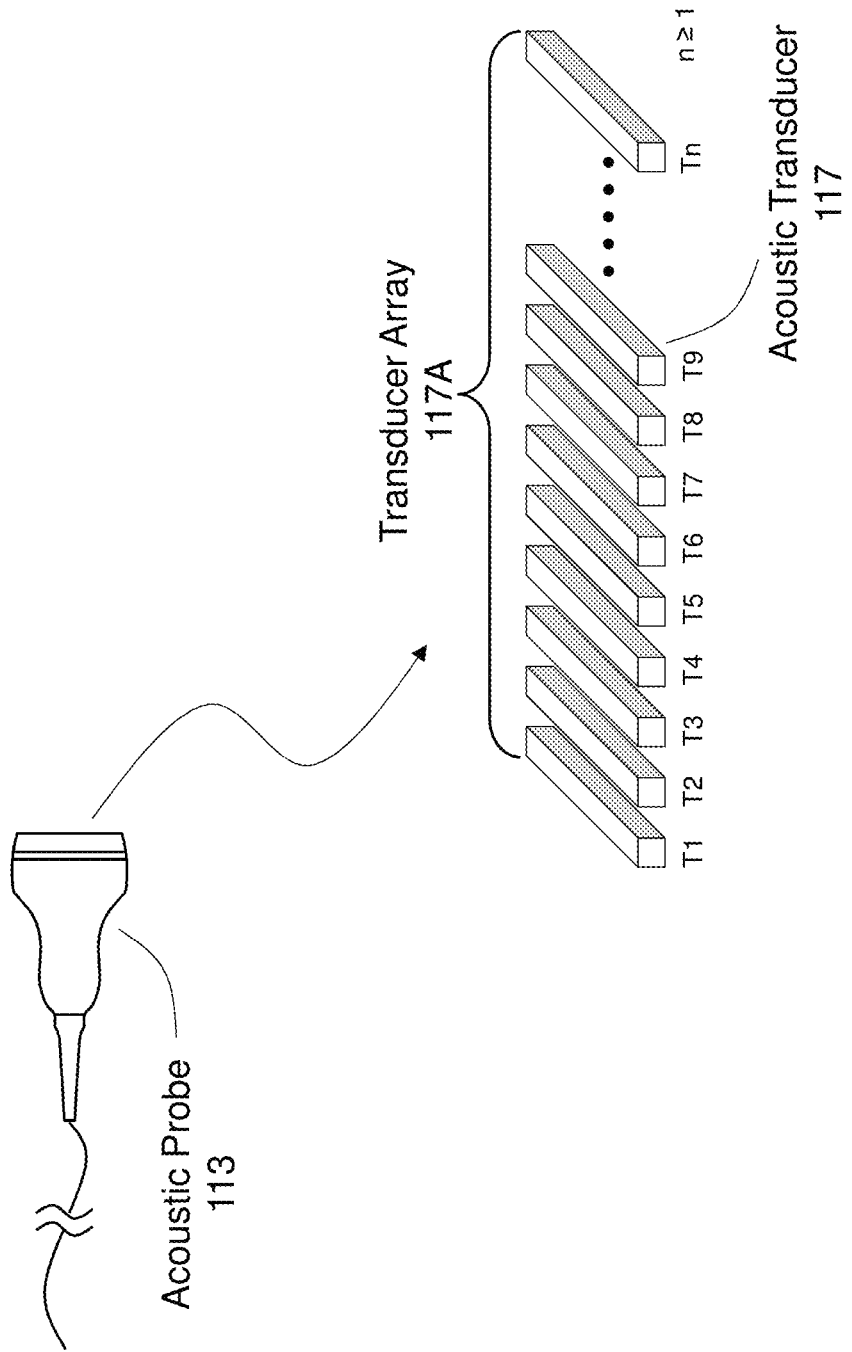

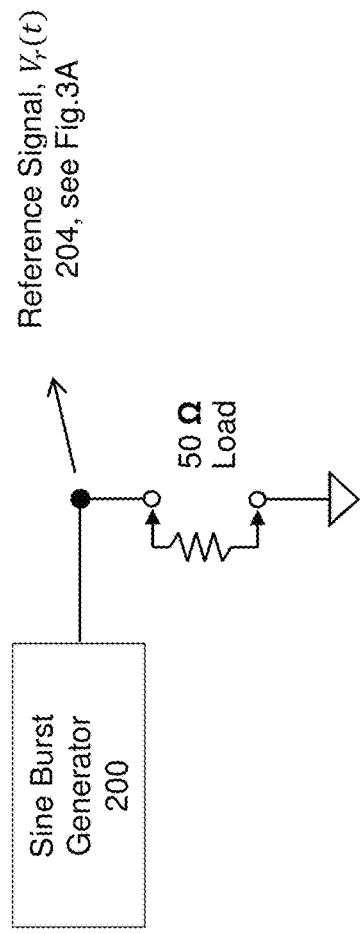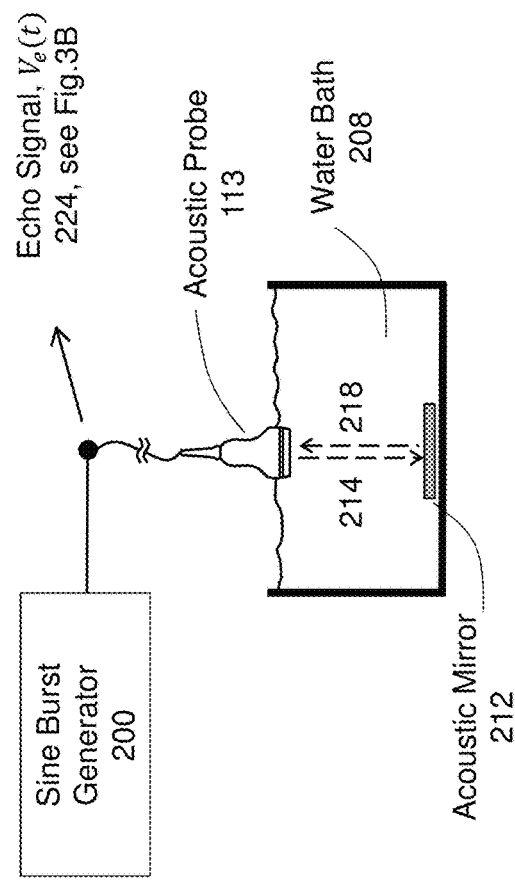
Fig. 2A Prior Art
Fig. 2B Prior Art

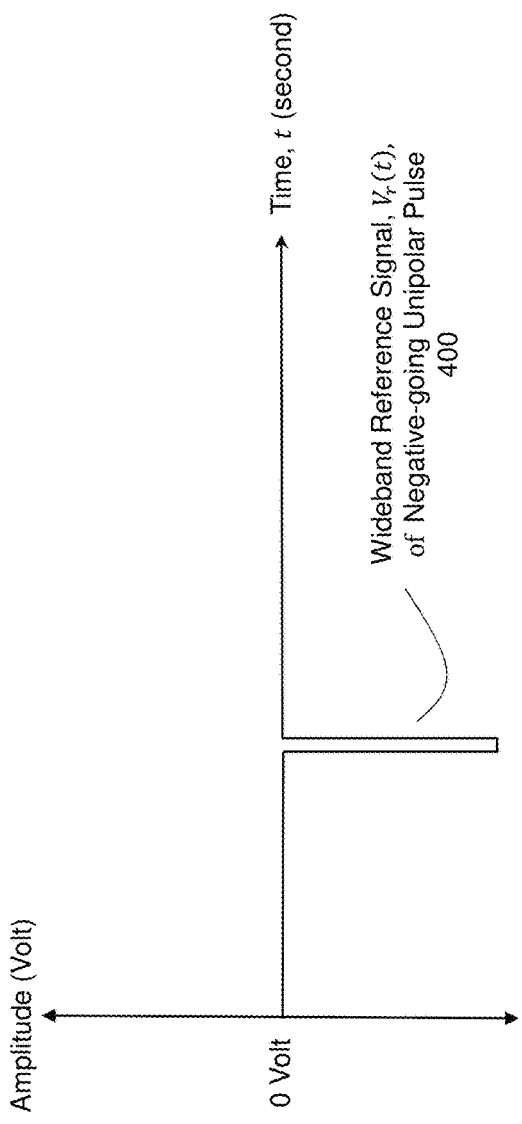
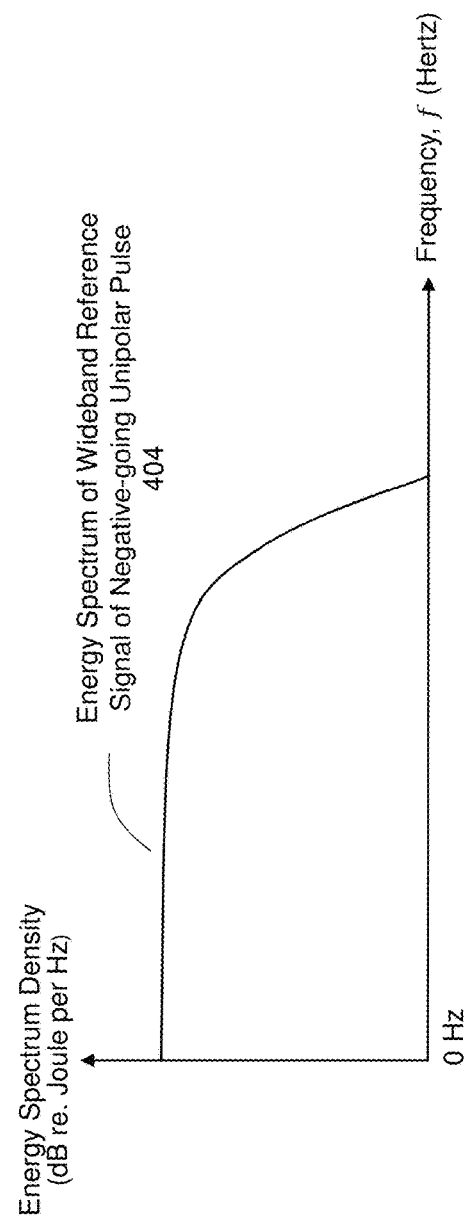

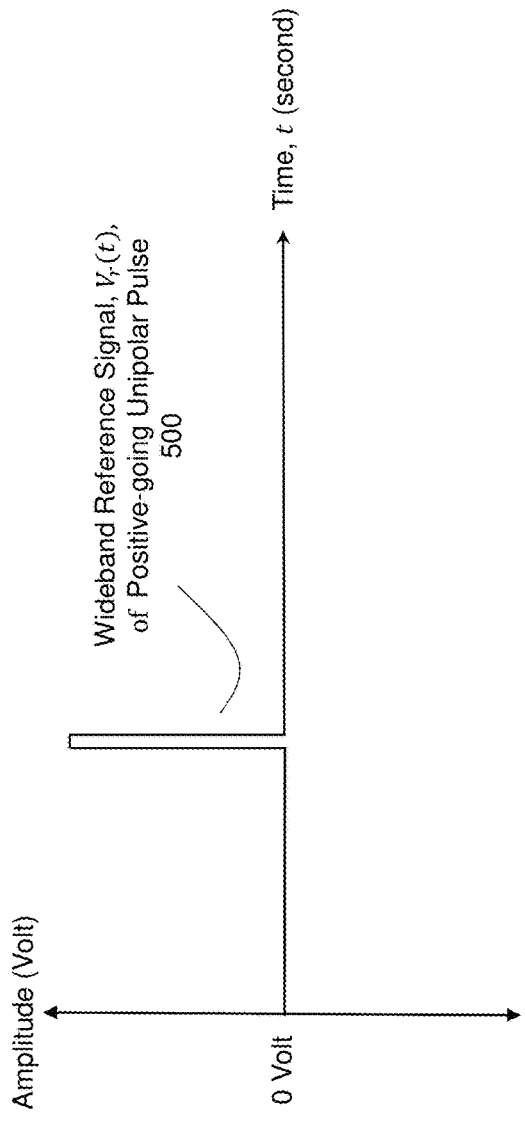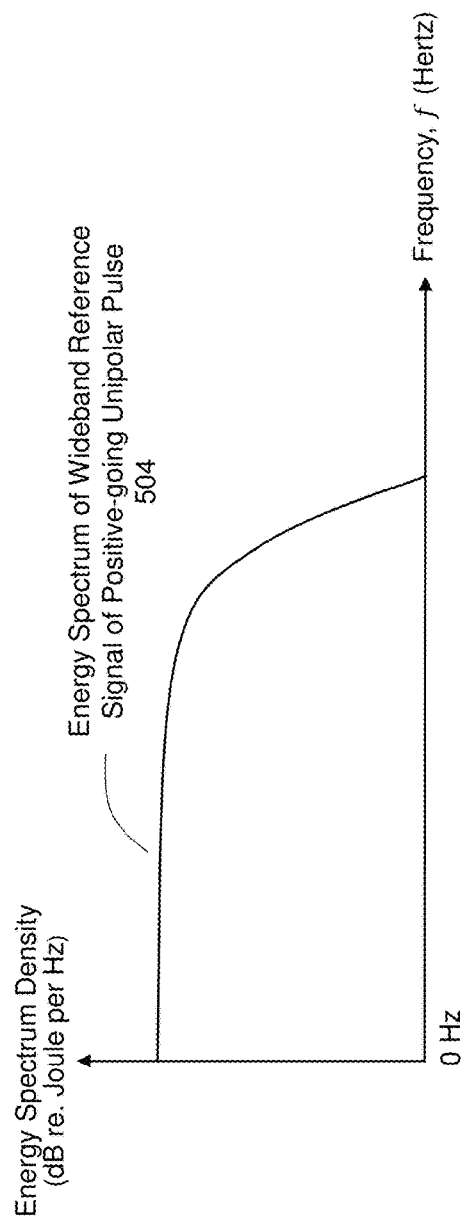

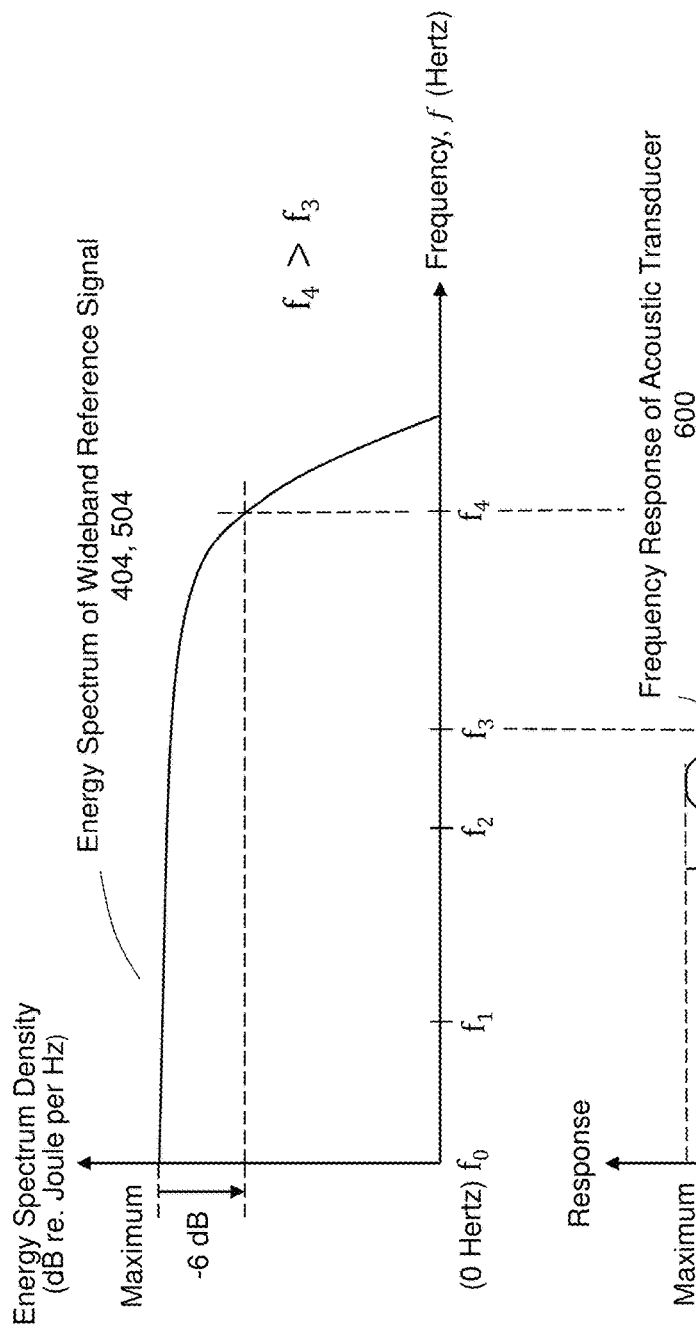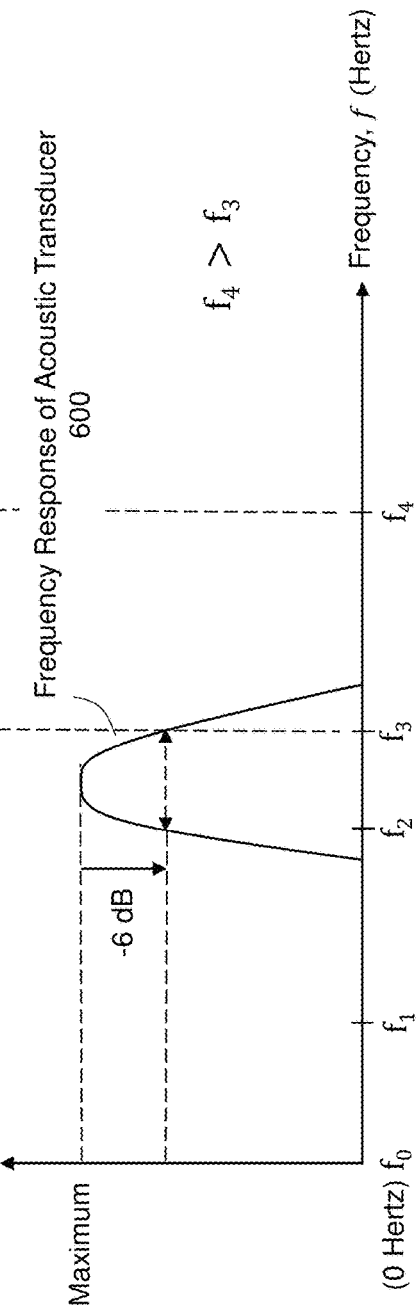

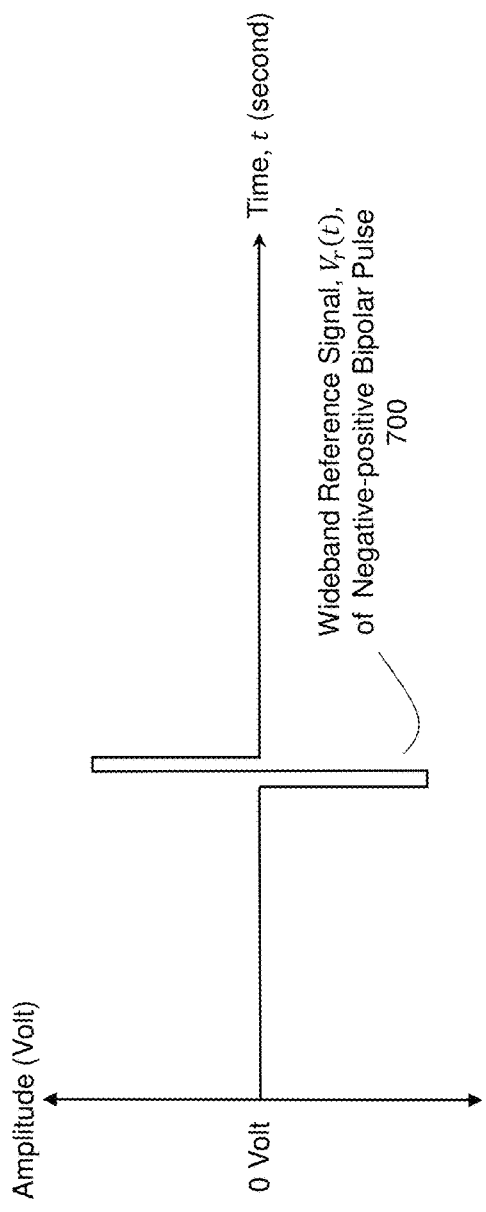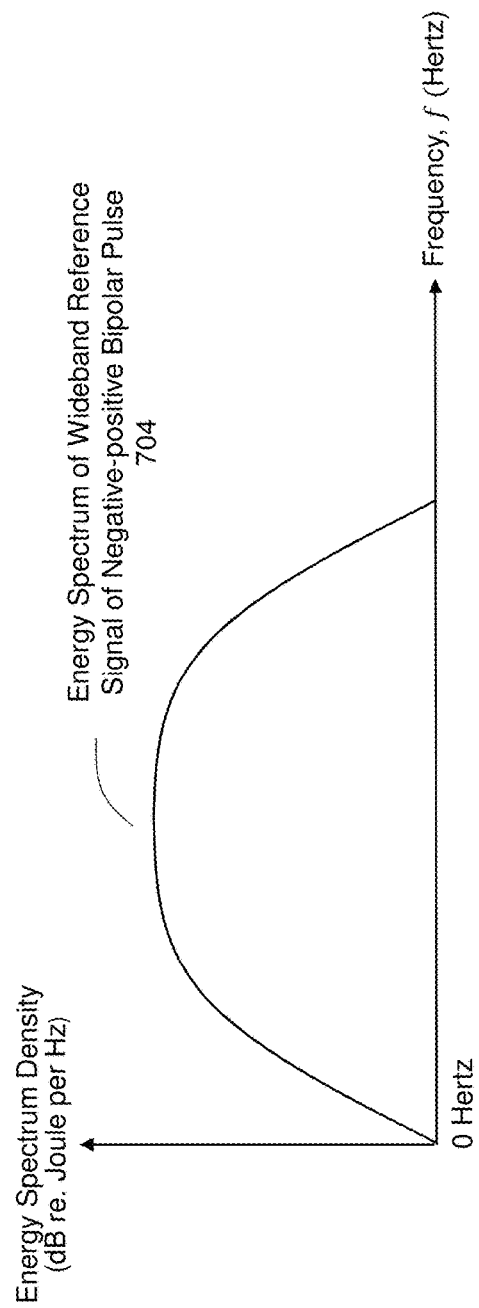
Fig. 7A
Fig. 7B

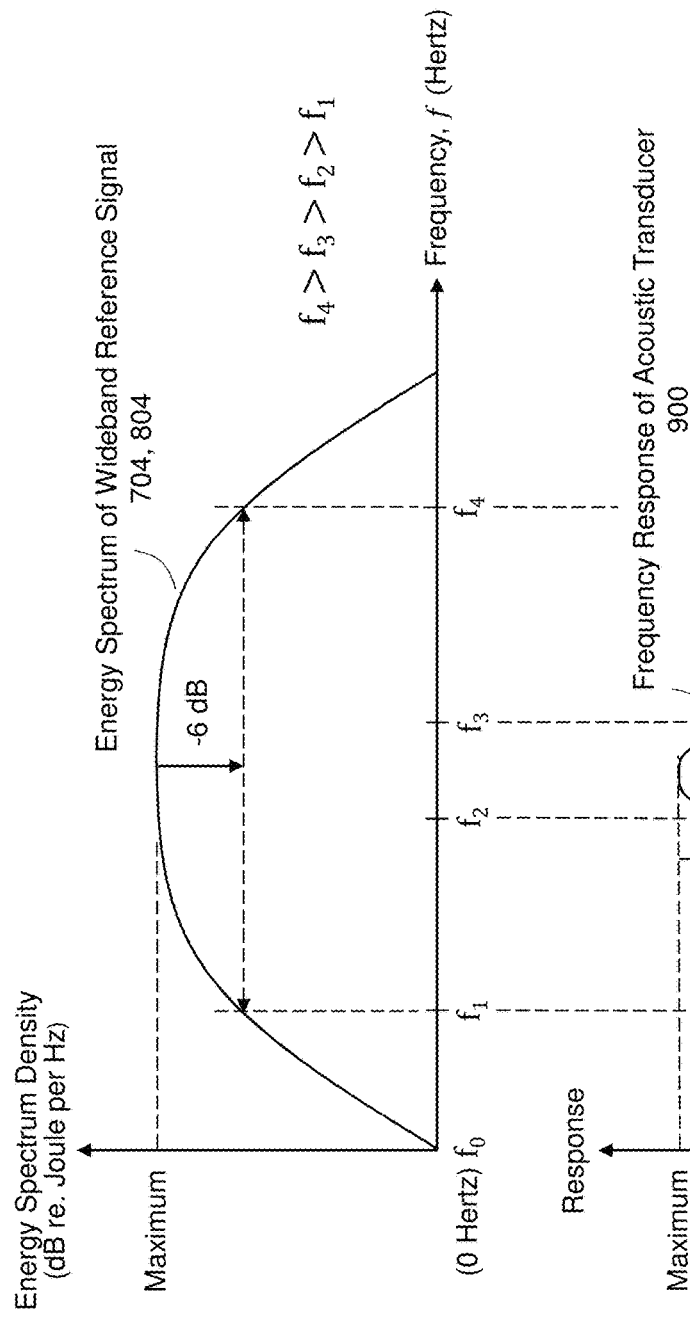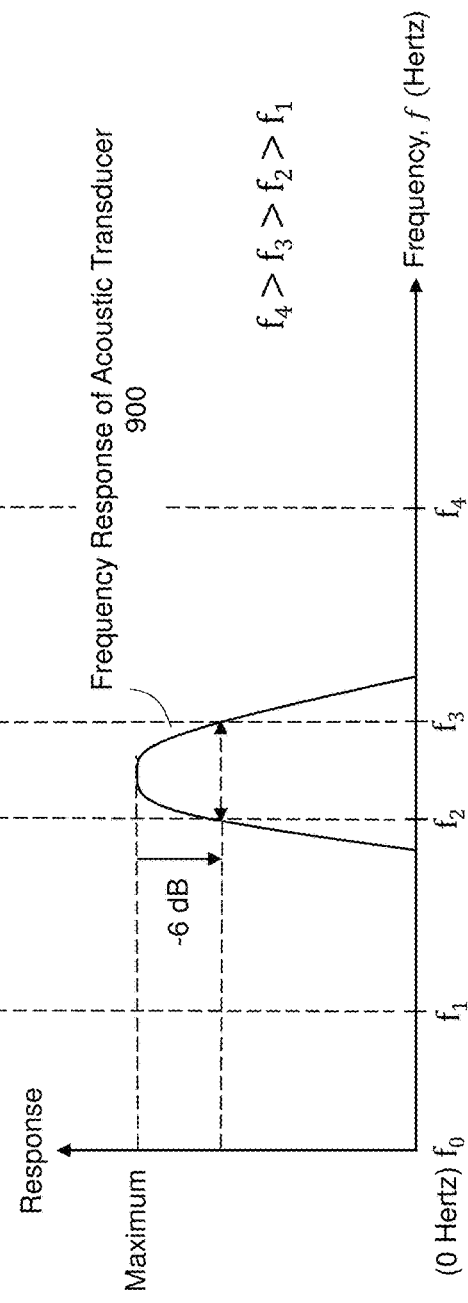
Fig. 9A
Fig. 9B

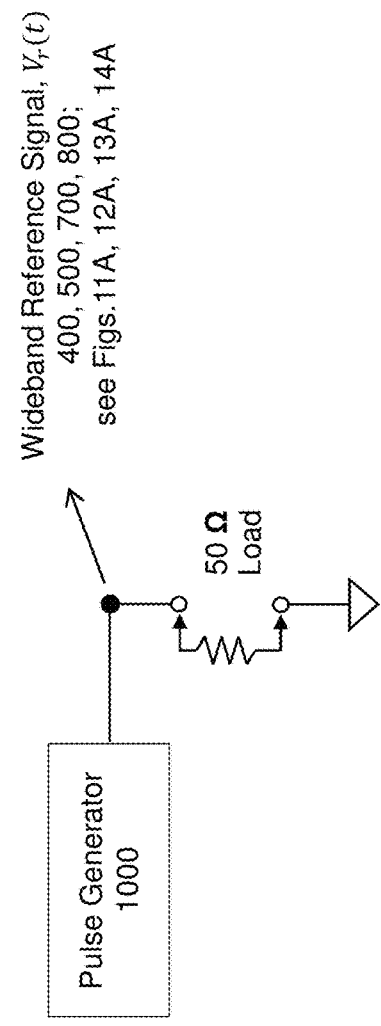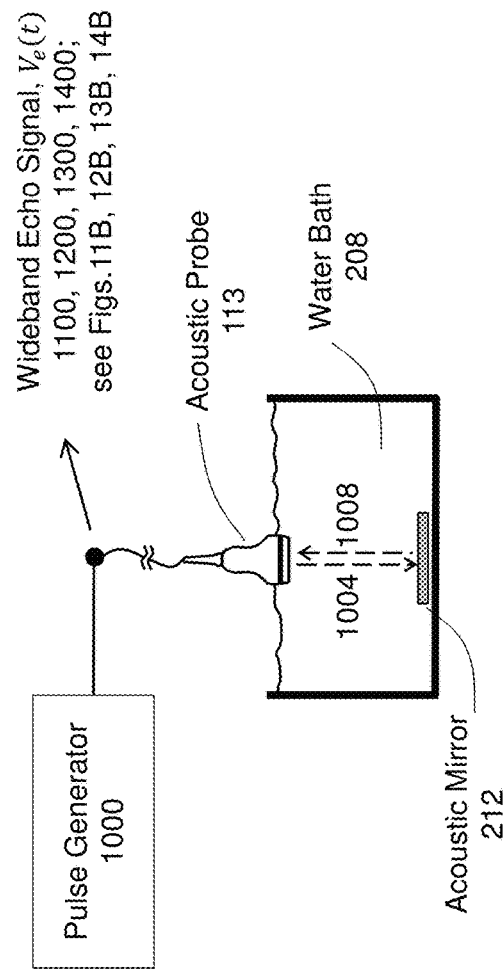
Fig. 10A
Fig. 10B

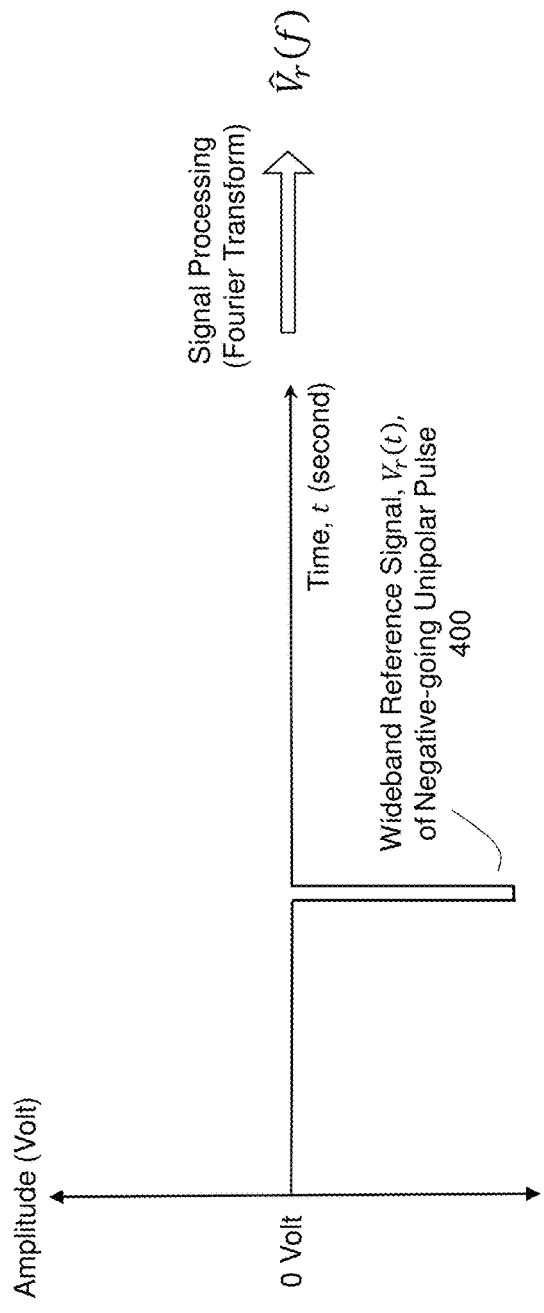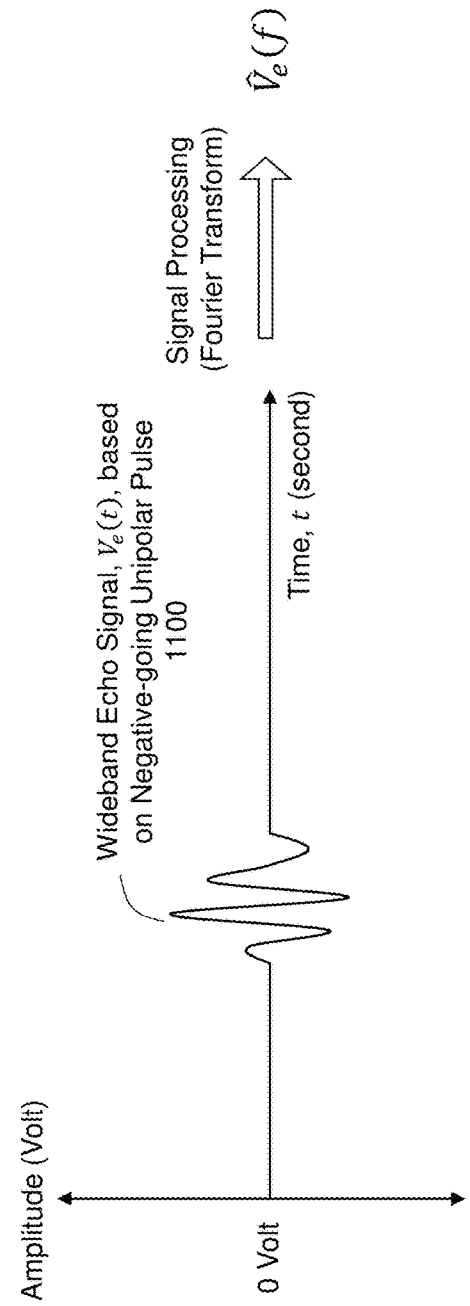

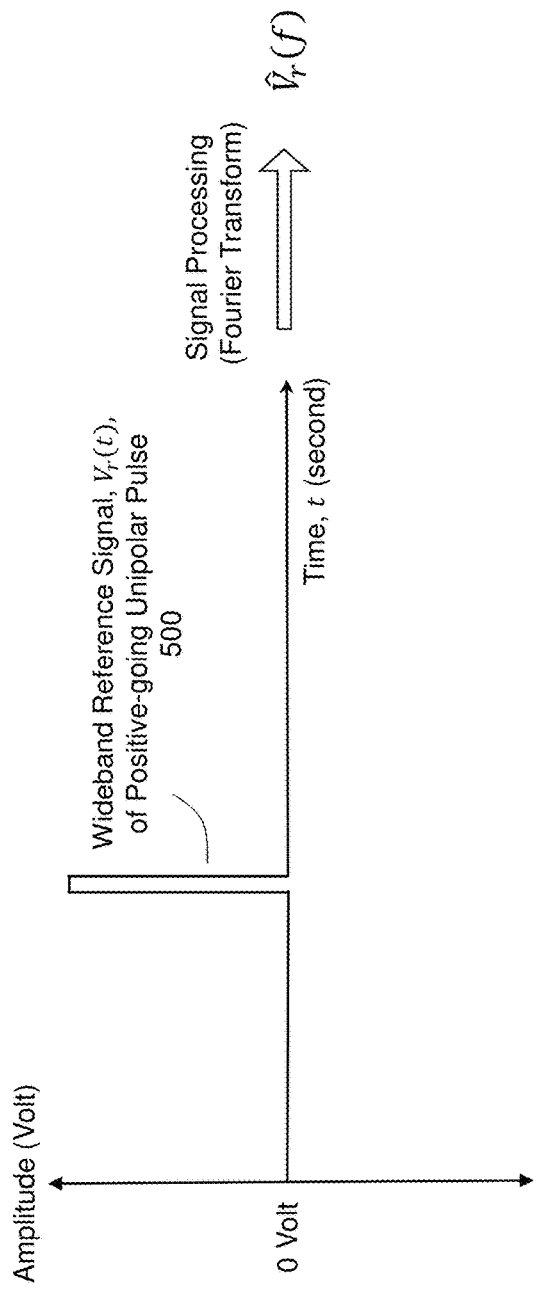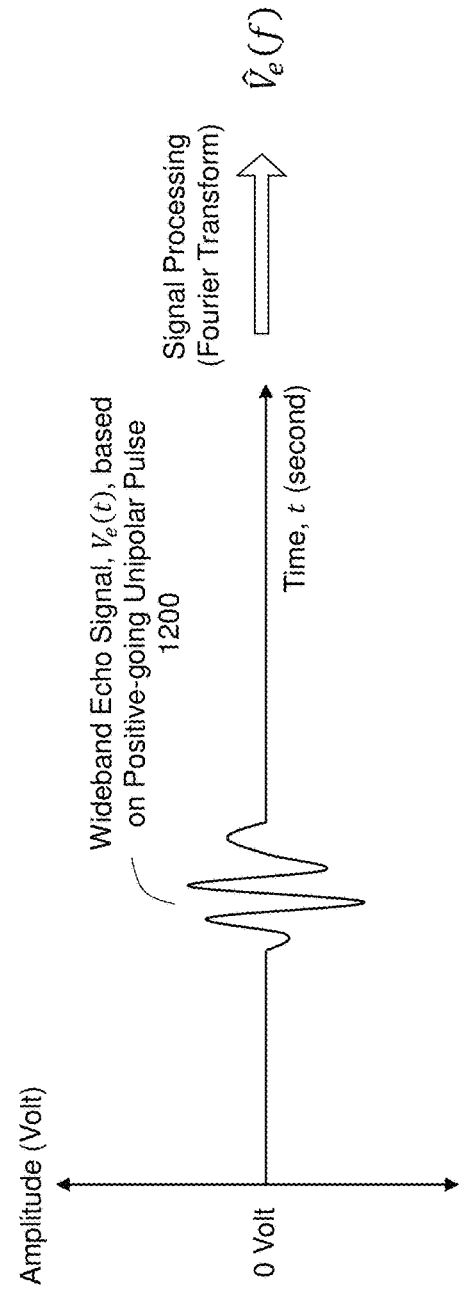

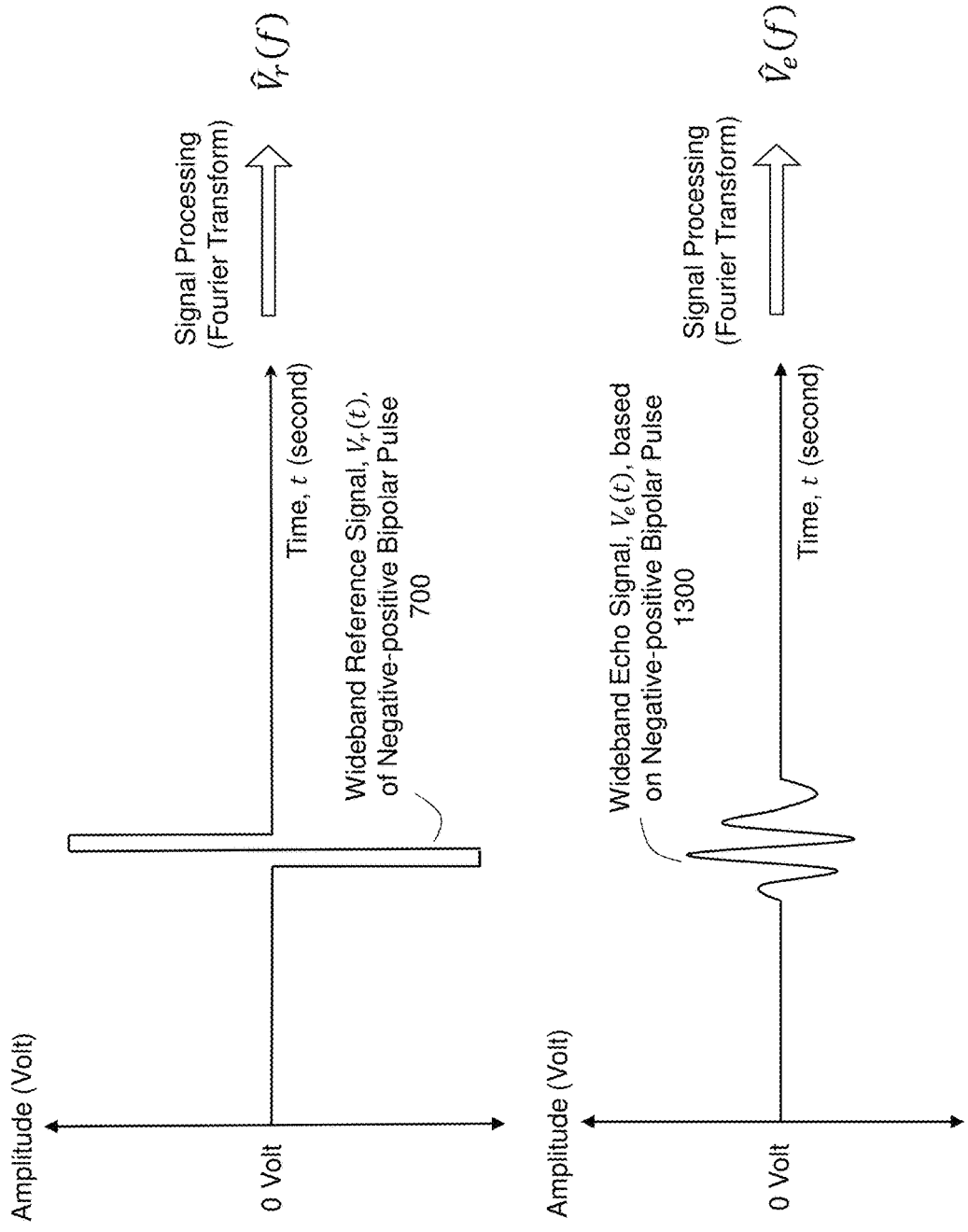

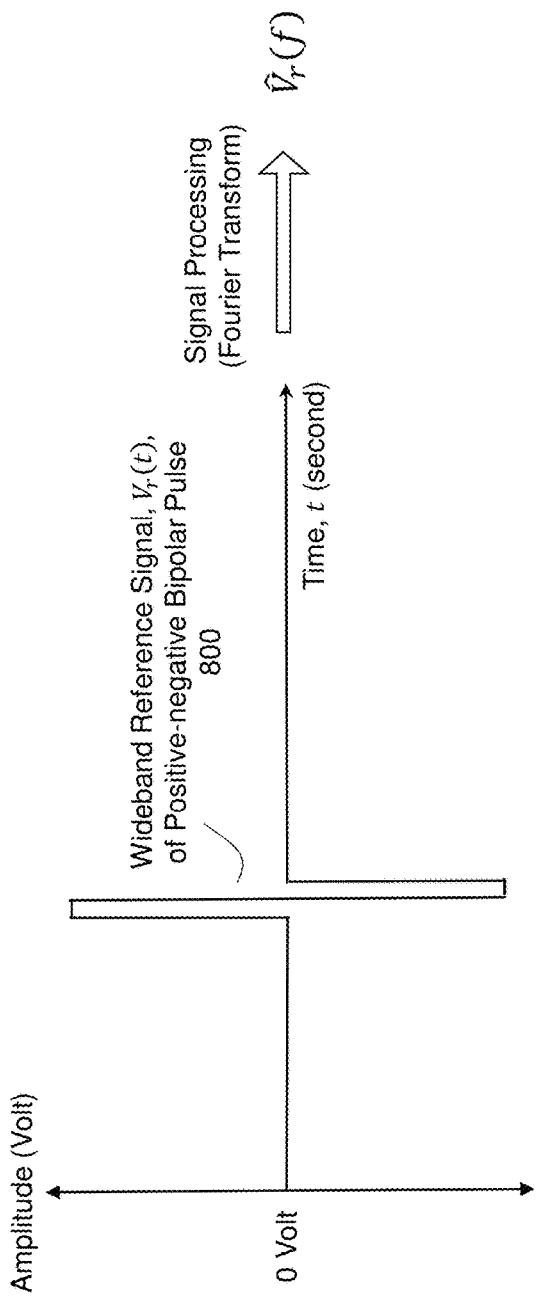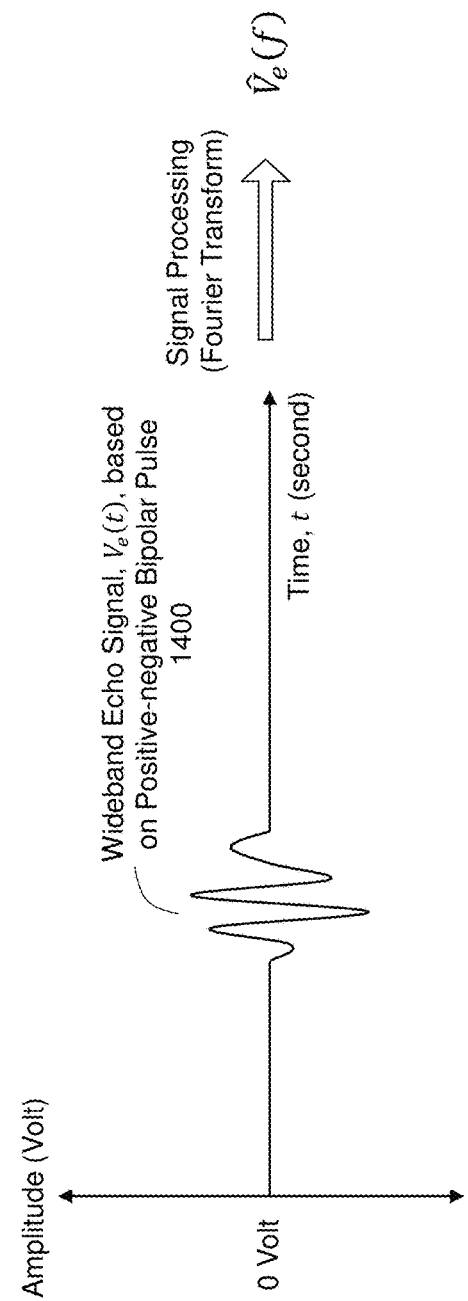

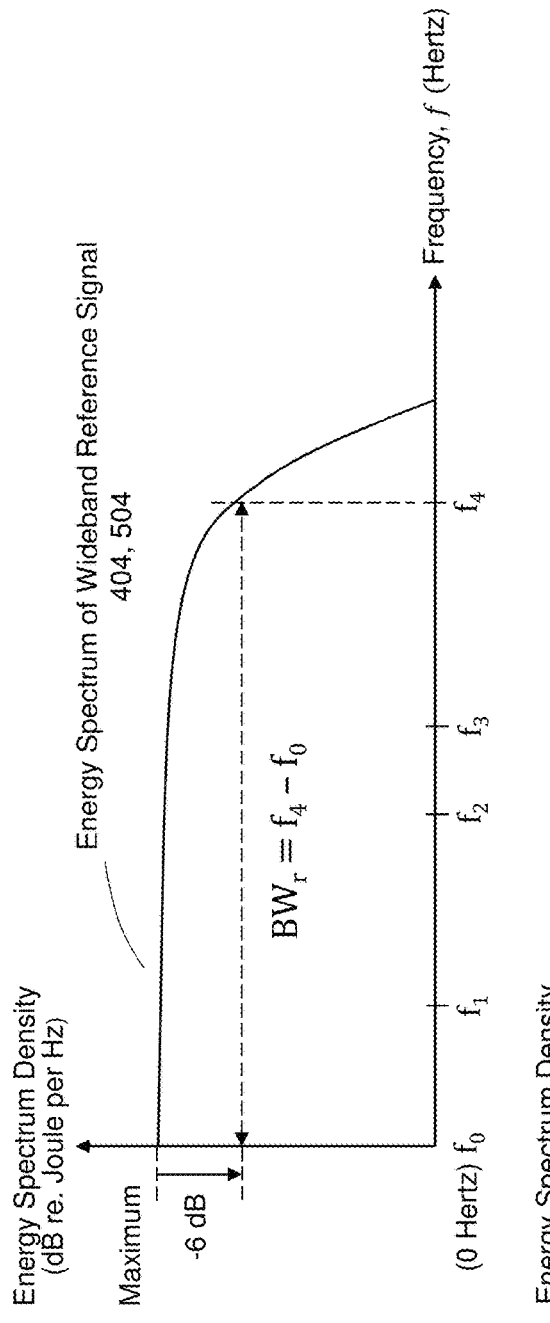
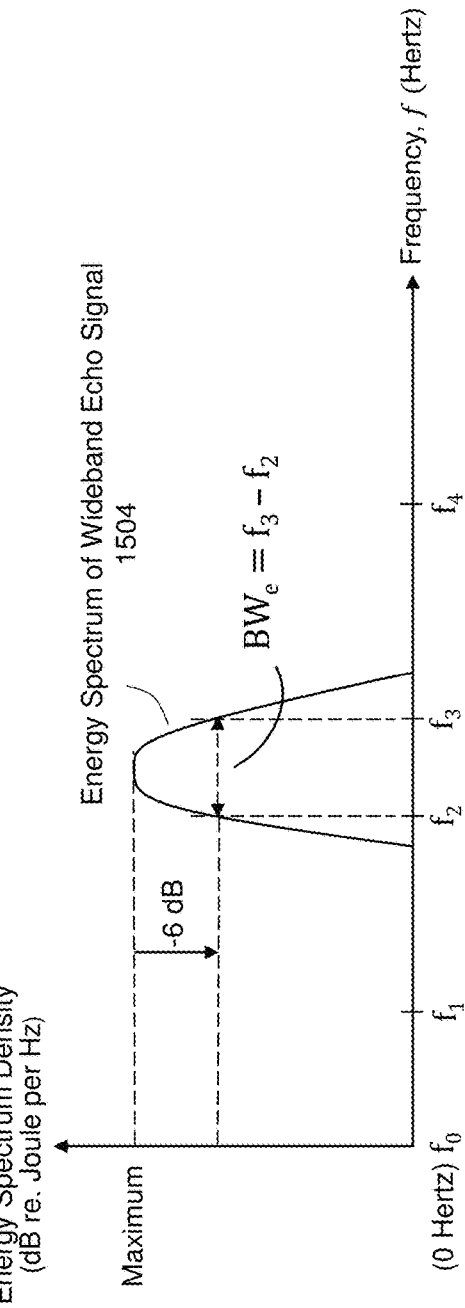

METHOD AND SYSTEM FOR MEASURING A CHARACTERISTIC LOOP SENSITIVITY FOR AN ACOUSTIC TRANSDUCER

BACKGROUND

Technical Field

The present invention relates to a method and system for measuring a characteristic loop sensitivity for an acoustic transducer in an acoustic probe.

Description of Related Art

An acoustic transducer is a key component in an acoustic imaging system. The technologies of acoustic imaging have been frequently employed to non-destructive testing, clinical diagnosis, and under water applications due to such advantages of acoustic imaging as non-invasive, non-ionization, real-time imaging, and cost-effectiveness. For example, acoustic imaging for clinical diagnosis, which is used for assessing the soft tissue structure and blood flow, is currently the most used clinical imaging modality after conventional X-ray radiography.

FIGS. 1A~1B show a typical structure for an acoustic probe in a prior art. An acoustic probe 113 has a transducer array 117A which comprises a plurality of acoustic transducer 117. The number of acoustic transducer 117 in the transducer array 117A is greater than or equal to one.

In the prior art, a sensitivity is used to assess the characteristics of an acoustic transducer 117. FIGS. 2A~2B show the method of sensitivity measurement for an acoustic transducer in an acoustic probe in a prior art. FIG. 2A shows a measuring arrangement for reference signal in a prior art. A sine burst generator 200 is arranged to output a sine burst signal at a specific frequency on an external 50-ohm load as a reference signal $V_r(t)$ 204. FIG. 2B shows a measuring arrangement for an acoustic probe 113 in a prior art. The sine burst generator of 200 is electrically coupled to an acoustic probe 113 which is immersed in a water bath 208 with an acoustic mirror 212. The acoustic probe 113 is driven by the sine burst generator 200 and transmits an acoustic sine burst wave 214 at the specific frequency. The acoustic probe 113 receives the reflected sine burst wave 218 from the acoustic mirror 212 and outputs an echo signal $V_e(t)$ 224.

FIG. 3A shows a reference signal for an acoustic probe in a prior art. The reference signal $V_r(t)$ 204 is a sine burst signal with a minimum-run of 15 cycles at a specific frequency; and, a peak-to-peak voltage of reference signal ($V_{ppr}$) is obtained. FIG. 3B shows an echo signal for an acoustic probe in a prior art. The echo signal $V_e(t)$ 224 is a sine burst signal at the specific frequency; and a peak-to-peak voltage of echo signal ($V_{ppe}$) is obtained. A loop sensitivity for the acoustic transducer is calculated based upon the peak-to-peak voltage of echo signal ($V_{ppe}$) to the peak-to-peak voltage of reference signal ($V_{ppr}$).

The disadvantage for the prior art is that one specific frequency is adopted for measuring a loop sensitivity of an acoustic transducer 117 in an acoustic probe 113. In an early stage, traditional acoustic probe responds to narrow band frequency only. However, wideband acoustic probe has been developed due to rapid progress in the acoustic technology development in recent years. Therefore, there is a general need for a method and system for measuring wideband characteristics of an acoustic transducer such as characteristic loop sensitivity ($S_{LC}$).

SUMMARY

The present invention discloses a method and system for measuring a characteristic loop sensitivity ($S_{LC}$) for an acoustic transducer in an acoustic probe.

A method for measuring a characteristic loop sensitivity ($S_{LC}$) for an acoustic transducer in an acoustic probe is introduced according to the present invention.

A pulse generator of 50-ohm source impedance, which is used to generate unipolar pulse and/or bipolar pulse, electrically couples to an external 50-ohm load to obtain a wideband reference signal $V_r(t)$ on the 50-ohm load and further obtain a function $\hat{V}_r(f)$ that is a Fourier Transform of the wideband reference signal $V_r(t)$. An energy of reference signal ($E_r$) for the wideband reference signal $V_r(t)$ is calculated as one of a time-integral of the power of wideband reference signal and a frequency-integral of the energy spectrum density of wideband reference signal.

In a first and a second embodiment, the adopted pulse is a negative-going unipolar pulse and a positive-going unipolar pulse, respectively; and in a third and a fourth embodiment, the adopted pulse is a negative-positive bipolar pulse and a positive-negative bipolar pulse, respectively.

Further, obtain an energy spectrum of wideband reference signal based on the function $\hat{V}_r(f)$, and calculate a bandwidth of reference signal ($BW_r$) for the energy spectrum of wideband reference signal.

An energy density of reference signal ($D_r$) for the wideband reference signal is calculated as the ratio of the energy of reference signal ($E_r$) for the wideband reference signal to the bandwidth of reference signal ($BW_r$) for the wideband reference signal.

The pulse generator of 50-ohm source impedance electrically couples to an acoustic probe for measuring the wideband characteristics of an acoustic transducer. The acoustic probe is immersed into a water bath with an acoustic mirror. An acoustic transducer in the acoustic probe is driven by the pulse generator of 50-ohm source impedance and transmits a wideband acoustic wave toward the acoustic mirror. The acoustic transducer receives the reflected wideband acoustic wave and outputs a wideband echo signal $V_e(t)$; and, a function $\hat{V}_e(f)$ that is a Fourier Transform of the wideband echo signal $V_e(t)$ is obtained. An energy of echo signal ($E_e$) for the wideband echo signal $V_e(t)$ is calculated as one of a time-integral of the power of wideband echo signal and a frequency-integral of the energy spectrum density of wideband echo signal.

Further, obtain an energy spectrum of the wideband echo signal based on the function $\hat{V}_e(f)$, and calculate a bandwidth of echo signal ($BW_e$) for the energy spectrum of the wideband echo signal.

An energy density of echo signal ($D_e$) for the wideband echo signal is calculated as the ratio of the energy of echo signal ($E_e$) for the wideband echo signal to the bandwidth of echo signal ($BW_e$) for the wideband echo signal.

A characteristic loop sensitivity ($S_{LC}$) for the acoustic transducer is defined as the ratio of the energy density of echo signal ($D_e$) for the wideband echo signal to the energy density of reference signal ($D_r$) for the wideband reference signal in decibel according to the present invention.

Furthermore, a plurality of characteristic loop sensitivity ($S_{LC}$) for each and all acoustic transducers in an acoustic transducer array is obtained by performing the measuring step for calculating the characteristic loop sensitivity ($S_{LC}$) sequentially or randomly over each and all acoustic transducers in an acoustic transducer array according to the present invention.

The method for measuring the characteristic loop sensitivity ($S_{LC}$) for the acoustic transducer is embedded in one of the firmware and the program memory, and the method for measuring the plurality of characteristic loop sensitivity ($S_{LC}$) for each and all acoustic transducers in an acoustic transducer array is embedded in one of the firmware and the program memory according to the present invention.

A system for measuring a characteristic loop sensitivity for an acoustic transducer in an acoustic probe is introduced according to the present invention. The system comprises a pulse generator, a signal processing unit, a transducer selector, and a control unit. The control unit further comprises a firmware, a program memory, and a storage.

BRIEF DESCRIPTION OF THE DRAWINGS

FIGS. 1A~1B show a typical structure for an acoustic probe in a prior art.

FIG. 2A shows a measuring arrangement for reference signal in a prior art.

FIG. 2B shows a measuring arrangement for an acoustic probe in a prior art.

FIGS. 4A~4B show a negative-going unipolar pulse used as a wideband reference signal and its energy spectrum for a first embodiment according to the present invention.

FIGS. 5A~5B show a positive-going unipolar pulse used as a wideband reference signal and its energy spectrum for a second embodiment according to the present invention.

FIG. 6A shows a typical energy spectrum of wideband reference signal based on a unipolar pulse signal for the first and second embodiments according to the present invention.

FIG. 6B shows a typical frequency response for an acoustic transducer in the first and second embodiments according to the present invention.

FIGS. 7A~7B show a negative-positive bipolar pulse used as a wideband reference signal and its energy spectrum for a third embodiment according to the present invention.

FIG. 9A shows a typical energy spectrum of wideband reference signal based on a bipolar pulse signal for the third and fourth embodiments according to the present invention.

FIG. 9B shows a typical frequency response for an acoustic transducer in the third and fourth embodiments according to the present invention.

FIG. 10A shows a measuring arrangement for a wideband reference signal according to the present invention.

FIG. 10B shows a measuring arrangement for an acoustic probe according to the present invention.

FIG. 11A shows an electrical waveform of a wideband reference signal and its Fourier Transform according to the present invention based on a negative-going unipolar pulse for a first embodiment.

FIG. 11B shows an electrical waveform of a wideband echo signal and its Fourier Transform according to the present invention based on the negative-going unipolar pulse for the first embodiment.

FIG. 12A shows an electrical waveform of a wideband reference signal and its Fourier Transform according to the present invention based on a positive-going unipolar pulse for a second embodiment.

FIG. 12B shows an electrical waveform of a wideband echo signal and its Fourier Transform according to the present invention based on the positive-going unipolar pulse for the second embodiment.

FIG. 13A shows an electrical waveform of a wideband reference signal and its Fourier Transform according to the present invention based on a first bipolar pulse for a third embodiment.

FIG. 13B shows an electrical waveform of a wideband echo signal and its Fourier Transform according to the present invention based on the first bipolar pulse for the third embodiment.

FIG. 14A shows an electrical waveform of a wideband reference signal and its Fourier Transform according to the present invention based on a second bipolar pulse for a fourth embodiment.

FIG. 14B shows an electrical waveform of a wideband echo signal and its Fourier Transform according to the present invention based on the second bipolar pulse for the fourth embodiment.

FIG. 15A shows a typical energy spectrum of wideband reference signal according to the present invention based on a unipolar pulse signal for the first and second embodiments.

FIG. 15B shows a typical energy spectrum of wideband echo signal according to the present invention based on a unipolar pulse signal for the first and second embodiments.

DETAILED DESCRIPTION OF THE INVENTION

Figure 3A:
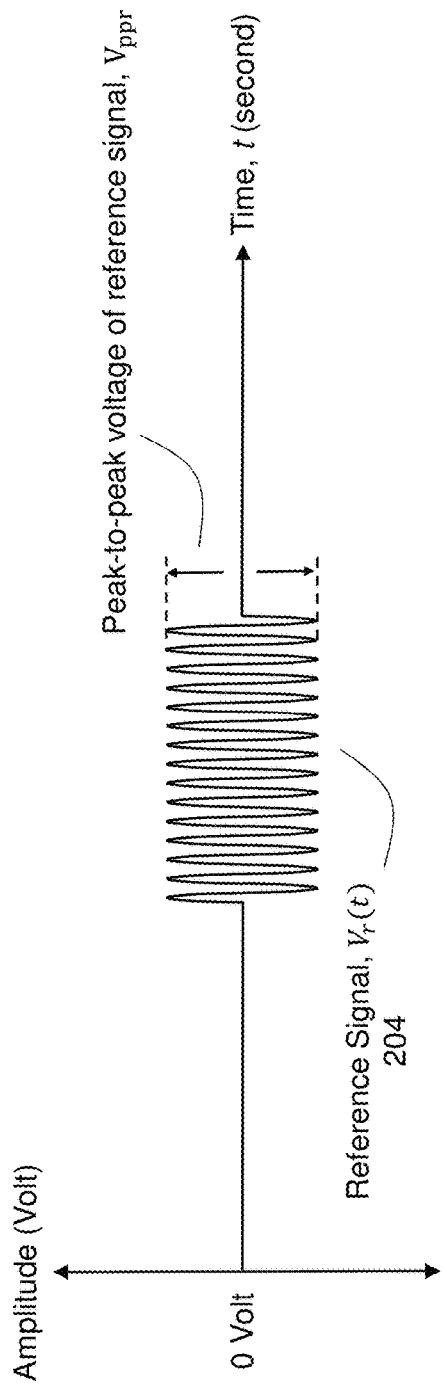
FIG. 3A shows a reference signal for an acoustic probe in a prior art.
Figure 3B:
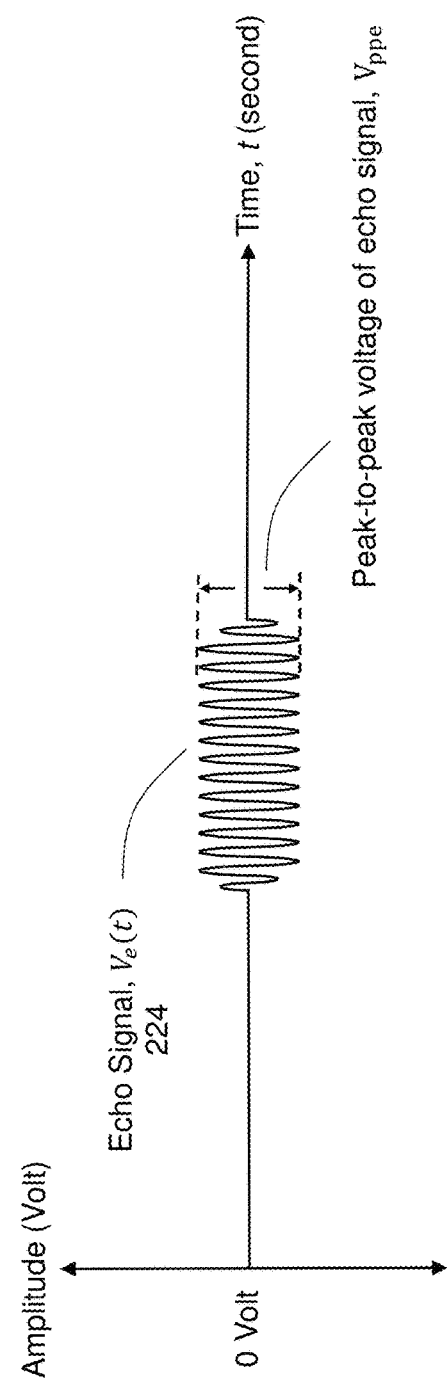
FIG. 3B shows an echo signal for an acoustic probe in a prior art.

The present invention discloses a method and system for measuring a characteristic loop sensitivity ($S_{LC}$) of an acoustic transducer in an acoustic probe. The "loop" means the pulse-echo mode in which an acoustic transducer transmits an acoustic wave out and a corresponding reflected echo wave is received by the same acoustic transducer.

A method for measuring a characteristic loop sensitivity for an acoustic transducer in an acoustic probe is introduced according to the present invention.

A pulse signal is adopted as a wideband reference signal for measuring wideband characteristics of an acoustic transducer according to the present invention. There are four embodiments of adopted pulse signal used in the present invention, which include a negative-going unipolar pulse 400 for a first embodiment, a positive-going unipolar pulse 500 for a second embodiment, a negative-positive bipolar pulse 700 for a third embodiment, and a positive-negative bipolar pulse 800 for a fourth embodiment, according to the present invention.

FIGS. 4A~4B show a negative-going unipolar pulse used as a wideband reference signal and its energy spectrum for a first embodiment according to the present invention. The wideband reference signal $V_r(t)$ of negative-going unipolar pulse 400 is adopted in the first embodiment, and an energy spectrum of wideband reference signal $$\frac{1}{50}|\hat{V}_r(f)|^2$$

of negative-going unipolar pulse 404 is obtained, in which the function $\hat{V}_r(f)$ is a Fourier Transform of the wideband reference signal $V_r(t)$ of negative-going unipolar pulse 400.

FIGS. 5A~5B show a positive-going unipolar pulse used as a wideband reference signal and its energy spectrum for a second embodiment according to the present invention. The wideband reference signal $V_r(t)$ of positive-going unipolar pulse 500 is adopted in the second embodiment, and an energy spectrum of wideband reference signal $$\frac{1}{50}|\hat{V}_r(f)|^2$$

of positive-going unipolar pulse 504 is obtained, in which the function $\hat{V}_r(f)$ is a Fourier Transform of the wideband reference signal $V_r(t)$ of positive-going unipolar pulse 500.

FIG. 6A shows a typical energy spectrum of wideband reference signal based on a unipolar pulse signal for the first and second embodiments according to the present invention. A maximum energy spectrum density of the energy spectrum of wideband reference signal 404, 504 is at 0 Hz ($f_0$). An upper bound frequency ($f_4$) of the energy spectrum of wideband reference signal 404, 504 is a frequency where the energy spectrum density drops down to a certain decibel value (e.g., −6 dB) relative to the maximum energy spectrum density at 0 Hz ($f_0$).

FIG. 6B shows a typical frequency response for an acoustic transducer in the first and second embodiments according to the present invention. A maximum frequency response of an acoustic transducer is usually at its central frequency or resonant frequency. The upper bound frequency ($f_3$) and lower bound frequency ($f_2$) for the frequency response of acoustic transducer 600 are frequencies where the frequency response drops down to a certain decibel value (e.g., −6 dB) relative to its maximum response located at between ($f_2$) and ($f_3$), respectively.

To assure a good signal-to-noise ratio for the measurement in the first and second embodiments, the requirement is that the upper bound frequency ($f_4$) of the energy spectrum of wideband reference signal 404, 504 is greater than the upper bound frequency ($f_3$) of the frequency response of the acoustic transducer 600, that is, $f_4 > f_3$, according to the present invention.

FIGS. 7A~7B show a negative-positive bipolar pulse used as a wideband reference signal and its energy spectrum for a third embodiment according to the present invention. The wideband reference signal $V_r(t)$ of negative-positive bipolar pulse 700 is adopted in the third embodiment, and an energy spectrum of wideband reference signal $$\frac{1}{50}|\hat{V}_r(f)|^2$$

of negative-positive bipolar pulse 704 is obtained, in which the function $\hat{V}_r(f)$ is a Fourier Transform of the wideband reference signal $V_r(t)$ of negative-positive bipolar pulse 700.

Figure 8A:
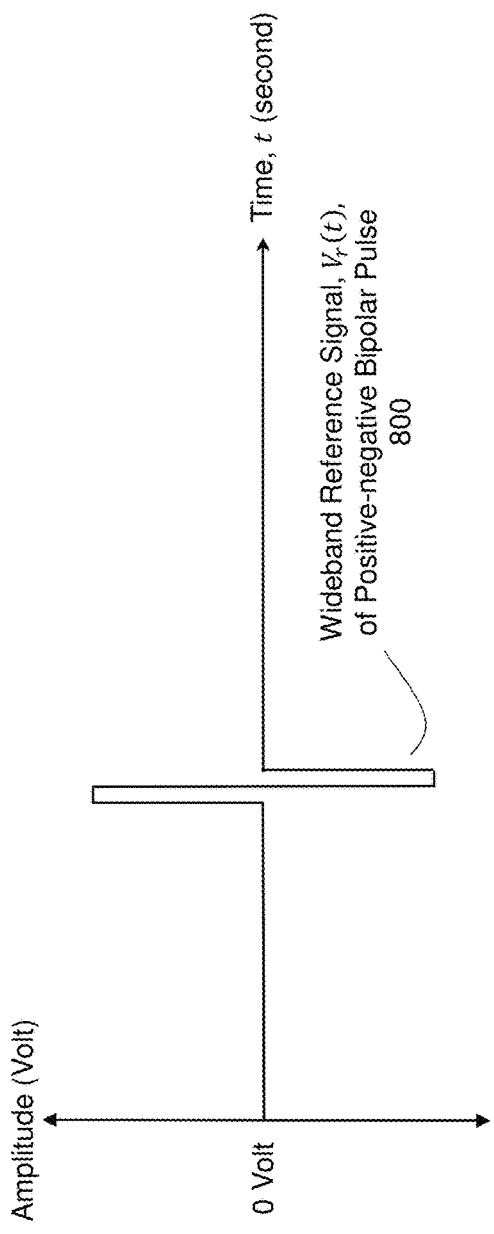
FIGS. 8A~8B show a positive-negative bipolar pulse used as a wideband reference signal and its energy spectrum for a fourth embodiment according to the present invention.
Figure 8B:
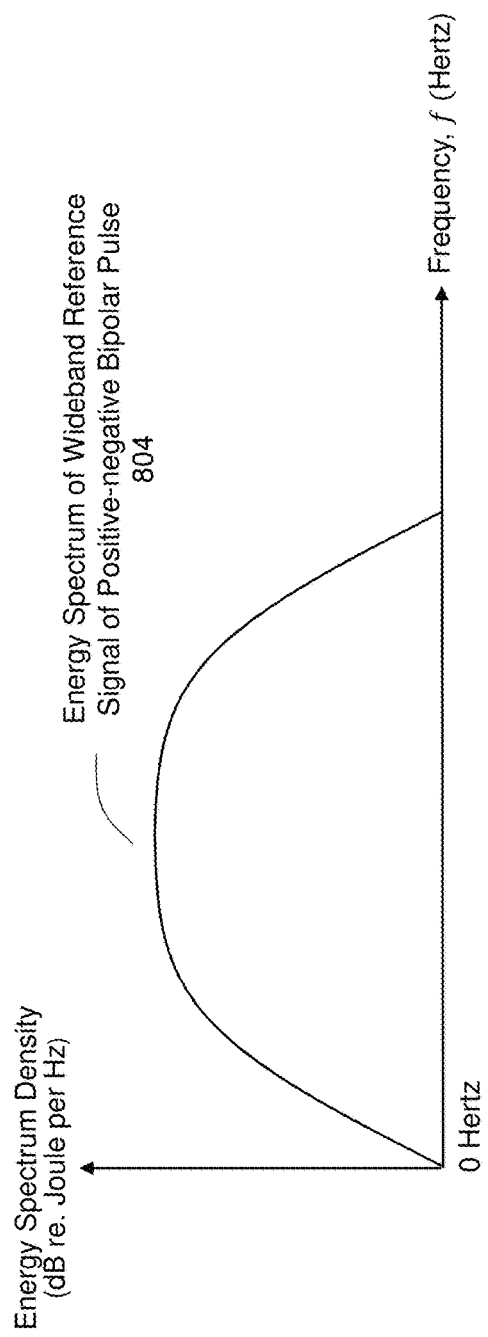

FIGS. 8A~8B show a positive-negative bipolar pulse used as a wideband reference signal and its energy spectrum for a fourth embodiment according to the present invention. The wideband reference signal $V_r(t)$ of positive-negative bipolar pulse 800 is adopted in the fourth embodiment, and an energy spectrum of wideband reference signal $$\frac{1}{50}|\hat{V}_r(f)|^2$$

of positive-negative bipolar pulse 804 is obtained, in which the function $\hat{V}_r(f)$ is a Fourier Transform of the wideband reference signal $V_r(t)$ of positive-negative bipolar pulse 800.

FIG. 9A shows a typical energy spectrum of wideband reference signal based on a bipolar pulse signal for the third and fourth embodiments according to the present invention. The lower bound frequency ($f_1$) and upper bound frequency ($f_4$) of the energy spectrum of wideband reference signal 704, 804 are frequencies where the energy spectrum density drops down to a certain decibel value (e.g., −6 dB) relative to its maximum located at between ($f_1$) and ($f_4$), respectively.

FIG. 9B shows a typical frequency response for an acoustic transducer in the third and fourth embodiments according to the present invention. A maximum frequency response for the acoustic transducer is usually at its central frequency or resonant frequency. The upper bound frequency ($f_3$) and lower bound frequency ($f_2$) for the frequency response of acoustic transducer 900 are frequencies where the frequency response drops down to a certain decibel value (e.g., −6 dB) relative to its maximum response located at between ($f_2$) and ($f_3$), respectively.

To assure a good signal-to-noise ratio for the measurement in the third and fourth embodiments, the requirement is that the upper bound frequency ($f_4$) of the energy spectrum of wideband reference signal 704, 804 is greater than the upper bound frequency ($f_3$) of the frequency response of the acoustic transducer 900 and the lower bound frequency ($f_1$) of the energy spectrum of wideband reference signal 704, 804 is smaller than the lower bound frequency ($f_2$) of the frequency response of the acoustic transducer 900; that is, $f_4 > f_3 > f_2 > f_1$, according to the present invention.

FIG. 10A shows a measuring arrangement for a wideband reference signal according to the present invention. An external 50-ohm load is electrically coupled to a pulse generator of 50-ohm source impedance 1000 that generates unipolar pulse and/or bipolar pulse to obtain a wideband reference signal $V_r(t)$ 400, 500, 700, 800 on the 50-ohm load.

FIG. 10B shows a measuring arrangement for an acoustic probe according to the present invention. The pulse generator of 50-ohm source impedance 1000 electrically couples to an acoustic probe 113 for measuring the wideband characteristics of an acoustic transducer 117. The acoustic probe 113 is immersed into a water bath 208 with an acoustic mirror 212. The acoustic probe 113 is aligned so that the acoustic wave is normally incident to and reflected from the acoustic mirror 212. An acoustic transducer 117 in the acoustic probe 113 is driven by the pulse generator of 50-ohm source impedance 1000 and transmits a wideband acoustic wave toward the acoustic mirror 212. The transmitted wideband acoustic wave 1004 travels and reaches the acoustic mirror 212 in the water bath 208 and is reflected backward to the acoustic transducer 117. The acoustic transducer 117 receives the reflected wideband acoustic wave 1008 and outputs a wideband echo signal $V_e(t)$ 1100, 1200, 1300, 1400.

FIG. 11A shows an electrical waveform of a wideband reference signal and its Fourier Transform according to the present invention based on a negative-going unipolar pulse for a first embodiment. The wideband reference signal $V_r(t)$ of negative-going unipolar pulse 400 is adopted in the first embodiment and a function $\hat{V}_r(f)$, that is a Fourier Transform of the wideband reference signal $V_r(t)$ of negative-going unipolar pulse 400, is obtained. Meanwhile, an energy of reference signal ($E_r$) for wideband reference signal $V_r(t)$ of negative-going unipolar pulse 400 is calculated as one of a time-integral of the power of wideband reference signal and a frequency-integral of the energy spectrum density of wideband reference signal; that is, $$E_r = \frac{1}{50}\int V_r(t)^2 dt = \frac{1}{50}\int |\hat{V}_r(f)|^2 df.$$

FIG. 11B shows an electrical waveform of a wideband echo signal and its Fourier Transform according to the present invention based on the negative-going unipolar pulse for the first embodiment. A wideband echo signal $V_e(t)$ based on negative-going unipolar pulse 1100 is obtained in the first embodiment and a function $\hat{V}_r(f)$, that is a Fourier Transform of the wideband echo signal $V_e(t)$ based on negative-going unipolar pulse 1100, is further obtained. Meanwhile, an energy of echo signal ($E_e$) for wideband echo signal $V_e(t)$ based on negative-going unipolar pulse 1100 is calculated as one of a time-integral of the power of wideband reference signal and a frequency-integral of the energy spectrum density of wideband echo signal; that is, $$E_e = \frac{1}{50}\int V_e(t)^2 dt = \frac{1}{50}\int |\hat{V}_e(f)|^2 df.$$

FIG. 12A shows an electrical waveform of a wideband reference signal and its Fourier Transform according to the present invention based on a positive-going unipolar pulse for a second embodiment. The wideband reference signal $V_r(t)$ of positive-going unipolar pulse 500 is adopted in the second embodiment and a function $\hat{V}_r(f)$, that is a Fourier Transform of the wideband reference signal $V_r(t)$ of positive-going unipolar pulse 500, is obtained. Meanwhile, an energy of reference signal ($E_r$) for wideband reference signal $V_r(t)$ of positive-going unipolar pulse 500 is calculated as one of a time-integral of the power of wideband reference signal and a frequency-integral of the energy spectrum density of wideband reference signal; that is, $$E_r = \frac{1}{50}\int V_r(t)^2 dt = \frac{1}{50}\int |\hat{V}_r(f)|^2 df.$$

FIG. 12B shows an electrical waveform of a wideband echo signal and its Fourier Transform according to the present invention based on the positive-going unipolar pulse for the second embodiment. A wideband echo signal $V_e(t)$ based on positive-going unipolar pulse 1200 is obtained in the second embodiment and a function $\hat{V}_e(f)$, that is a Fourier Transform of the wideband echo signal $V_e(t)$ based on positive-going unipolar pulse 1200, is further obtained. Meanwhile, an energy of echo signal ($E_e$) for wideband echo signal $V_e(t)$ based on positive-going unipolar pulse 1200 is calculated as one of a time-integral of the power of wideband reference signal and a frequency-integral of the energy spectrum density of wideband echo signal; that is, $$E_e = \frac{1}{50}\int V_e(t)^2 dt = \frac{1}{50}\int |\hat{V}_e(f)|^2 df.$$

FIG. 13A shows an electrical waveform of a wideband reference signal and its Fourier Transform according to the present invention based on a first bipolar pulse for a third embodiment. The wideband reference signal $V_r(t)$ of negative-positive bipolar pulse 700 is adopted in the third embodiment and a function $\hat{V}_r(f)$, that is a Fourier Transform of the wideband reference signal $V_r(t)$ of negative-positive bipolar pulse 700, is obtained. Meanwhile, an energy of reference signal ($E_r$) for wideband reference signal $V_r(t)$ of negative-positive bipolar pulse 700 is calculated as one of a time-integral of the power of wideband reference signal and a frequency-integral of the energy spectrum density of wideband reference signal; that is, $$E_r = \frac{1}{50}\int V_r(t)^2 dt = \frac{1}{50}\int |\hat{V}_r(f)|^2 df.$$

FIG. 13B shows an electrical waveform of a wideband echo signal and its Fourier Transform according to the present invention based on the first bipolar pulse for the third embodiment. A wideband echo signal $V_e(t)$ based on negative-positive bipolar pulse 1300 is obtained in the third embodiment and a function $\hat{V}_e(f)$, that is a Fourier Transform of the wideband echo signal $V_e(t)$ based on negative-positive bipolar pulse 1300, is further obtained. Meanwhile, an energy of echo signal ($E_e$) for wideband echo signal $V_e(t)$ based on negative-positive bipolar pulse 1300 is calculated as one of a time-integral of the power of wideband reference signal and a frequency-integral of the energy spectrum density of wideband echo signal; that is, $$E_e = \frac{1}{50}\int V_e(t)^2 dt = \frac{1}{50}\int |\hat{V}_e(f)|^2 df.$$

FIG. 14A shows an electrical waveform of a wideband reference signal and its Fourier Transform according to the present invention based on a second bipolar pulse for a fourth embodiment. The wideband reference signal $V_r(t)$ of positive-negative bipolar pulse 800 is adopted in the fourth embodiment and a function $\hat{V}_r(f)$, that is a Fourier Transform of the wideband reference signal $V_r(t)$ of positive-negative bipolar pulse 800, is obtained. Meanwhile, an energy of reference signal ($E_r$) for wideband reference signal $V_r(t)$ of positive-negative bipolar pulse 800 is calculated as one of a time-integral of the power of wideband reference signal and a frequency-integral of the energy spectrum density of wideband reference signal; that is, $$E_r = \frac{1}{50}\int V_r(t)^2 dt = \frac{1}{50}\int |\hat{V}_r(f)|^2 df.$$

FIG. 14B shows an electrical waveform of a wideband echo signal and its Fourier Transform according to the present invention based on the second bipolar pulse for the fourth embodiment. A wideband echo signal $V_e(t)$ based on positive-negative bipolar pulse 1400 is obtained in the fourth embodiment and a function $\hat{V}_e(f)$, that is a Fourier Transform of the wideband echo signal $V_e(t)$ based on positive-negative bipolar pulse 1400, is further obtained. Meanwhile, an energy of echo signal ($E_e$) for wideband echo signal $V_e(t)$ based on positive-negative bipolar pulse 1400 is calculated as one of a time-integral of the power of wideband reference signal and a frequency-integral of the energy spectrum density of wideband echo signal; that is, $$E_e = \frac{1}{50} \int V_e(t)^2 dt = \frac{1}{50} \int |\hat{V}_e(f)|^2 df.$$

FIG. 15A shows a typical energy spectrum of wideband reference signal according to the present invention based on a unipolar pulse signal for the first and second embodiments. The maximum energy spectrum density of the energy spectrum of wideband reference signal 404, 504 is at 0 Hz ($f_0$). The upper bound frequency ($f_4$) of the energy spectrum of wideband reference signal 404, 504 is a frequency where the energy spectrum density drops down to a certain decibel value (e.g., −6 dB) relative to the maximum energy spectrum density at 0 Hz ($f_0$). A frequency bandwidth of reference signal ($BW_r$) for the energy spectrum of wideband reference signal 404, 504 is obtained as the frequency difference between the upper bound frequency ($f_4$) and 0 Hz ($f_0$); that is, $BW_r = f_4 - f_0$.

FIG. 15B shows a typical energy spectrum of wideband echo signal according to the present invention based on a unipolar pulse signal for the first and second embodiments. A maximum energy spectrum density of the energy spectrum of wideband echo signal 1504 is usually at resonant or central frequency of an acoustic transducer. The lower bound frequency ($f_2$) and upper bound frequency ($f_3$) of the energy spectrum of wideband echo signal 1504 are frequencies where the energy spectrum density drops down to a certain decibel value (e.g., −6 dB) relative to the maximum energy spectrum density located at between ($f_2$) and ($f_3$), respectively. A frequency bandwidth of echo signal ($BW_e$) for the energy spectrum of wideband echo signal 1504 is obtained as the frequency difference between the upper bound frequency ($f_3$) and lower bound frequency ($f_2$); that is, $BW_e = f_3 - f_2$.

Figure 16A:
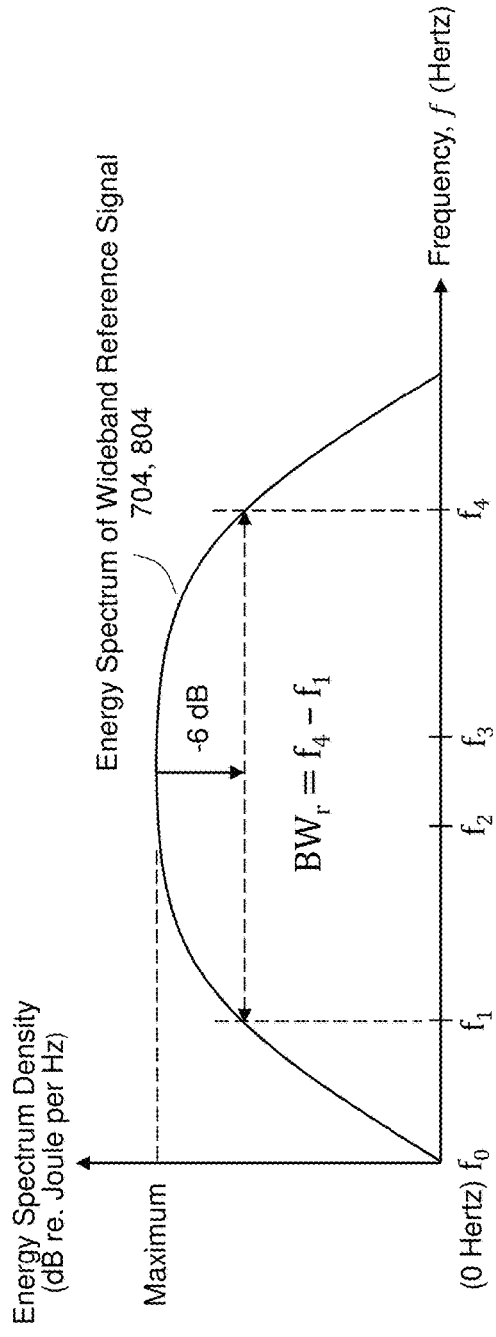
FIG. 16A shows a typical energy spectrum of wideband reference signal according to the present invention based on a bipolar pulse signal for a third and fourth embodiments.

FIG. 16A shows a typical energy spectrum of wideband reference signal according to the present invention based on a bipolar pulse signal for a third and fourth embodiments. The lower bound frequency ($f_1$) and upper bound frequency ($f_4$) of the energy spectrum of wideband reference signal 704, 804 are frequencies where the energy spectrum density drops down to a certain decibel value (e.g., −6 dB) relative to its maximum located at between ($f_1$) and ($f_4$), respectively. A frequency bandwidth of reference signal ($BW_r$) for the energy spectrum of wideband reference signal 704, 804 is obtained as the frequency difference between the upper bound frequency ($f_4$) and lower bound frequency ($f_1$); that is, $BW_r = f_4 - f_1$.

Figure 16B:
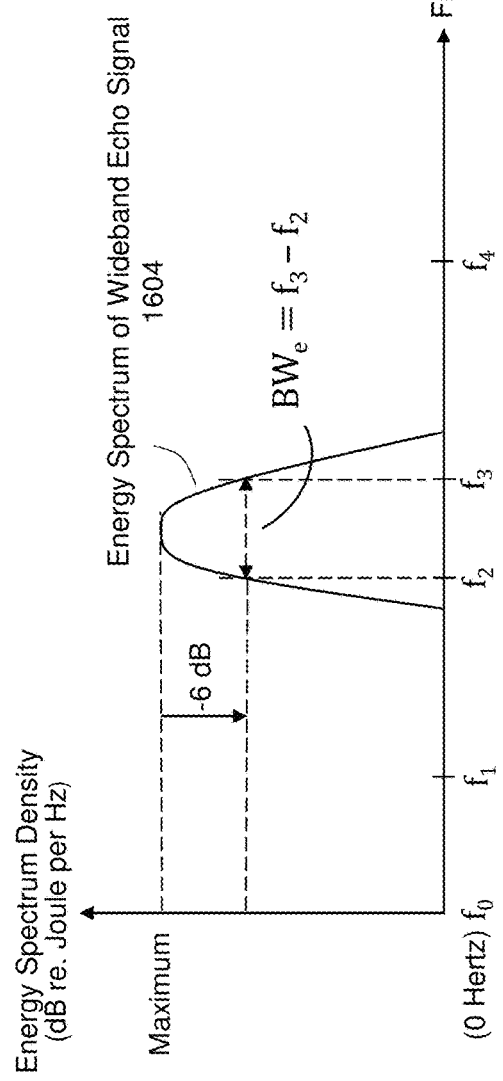
FIG. 16B shows a typical energy spectrum of wideband echo signal according to the present invention based on a bipolar pulse reference signal for the third and fourth embodiments.

FIG. 16B shows a typical energy spectrum of wideband echo signal according to the present invention based on a bipolar pulse reference signal for the third and fourth embodiments. A maximum energy spectrum density of the energy spectrum of wideband echo signal 1604 is usually at resonant or central frequency of an acoustic transducer. The lower bound frequency ($f_2$) and upper bound frequency ($f_3$) of the energy spectrum of wideband echo signal 1604 are frequencies where the energy spectrum density drops down to a certain decibel value (e.g., −6 dB) relative to the maximum energy spectrum density located at between ($f_2$) and ($f_3$), respectively. A frequency bandwidth of echo signal ($BW_e$) for the energy spectrum of wideband echo signal 1604 is obtained as the frequency difference between the upper bound frequency ($f_3$) and lower bound frequency ($f_2$); that is, $BW_e = f_3 - f_2$.

For the wideband reference signal $V_r(t)$, an energy density of reference signal ($D_r$) is calculated as the ratio of the energy of reference signal ($E_r$) to the frequency bandwidth of reference signal ($BW_r$); that is, $$D_r = \frac{E_r}{BW_r},$$

according to the present invention.

For the wideband echo signal $V_e(t)$, an energy density of echo signal ($D_e$) is calculated as the ratio of the energy of echo signal ($E_e$) to the frequency bandwidth of echo signal ($BW_r$); that is, $$D_e = \frac{E_e}{BW_e},$$

according to the present invention.

A characteristic loop sensitivity ($S_{LC}$) for the acoustic transducer is defined as the ratio of the energy density of echo signal ($D_e$) for the wideband echo signal to the energy density of reference signal ($D_r$) for the wideband reference signal in decibel; that is, $$S_{LC} \stackrel{def}{=} 10 \log\left(\frac{D_e}{D_r}\right),$$

according to the present invention.

Figure 17:
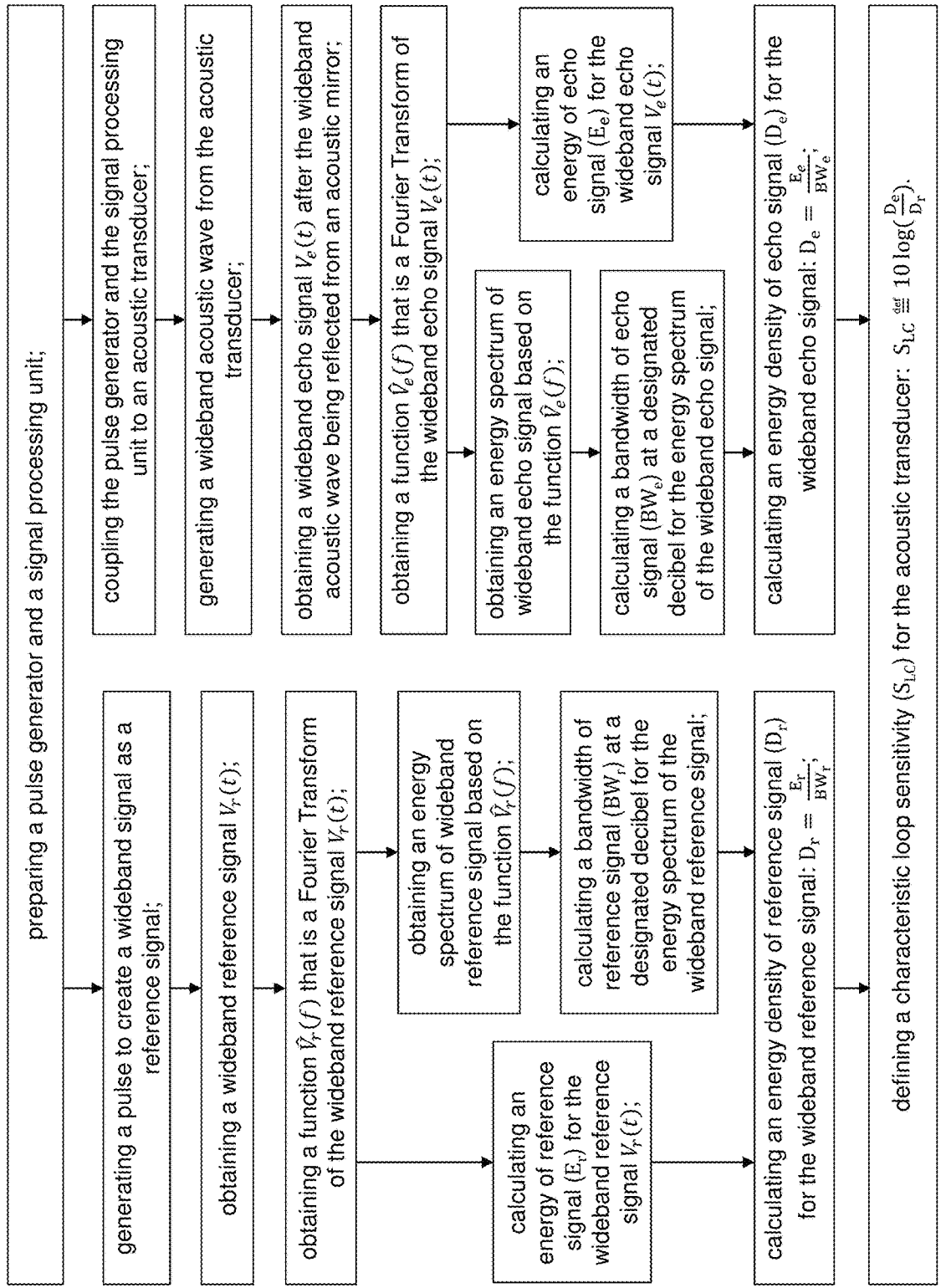
FIG. 17 shows a flow chart for measuring a characteristic loop sensitivity for an acoustic transducer according to the present invention.

FIG. 17 shows a flow chart for measuring a characteristic loop sensitivity for an acoustic transducer according to the present invention.

The measuring step for obtaining an energy density of reference signal ($D_r$) for a wideband reference signal comprises:

preparing a pulse generator and a signal processing unit;

generating a pulse to create a wideband signal as a reference signal;

obtaining a wideband reference signal $V_r(t)$;

obtaining a function $\hat{V}_r(f)$ that is a Fourier Transform of the wideband reference signal $V_r(t)$;

obtaining an energy spectrum of wideband reference signal based on the function $\hat{V}_r(f)$;

calculating a bandwidth of reference signal ($BW_r$) at a designated decibel for the energy spectrum of the wideband reference signal;

calculating an energy of reference signal ($E_r$) for the wideband reference signal $V_r(t)$;

calculating an energy density of reference signal ($D_r$) for the wideband reference signal as follows:

$$D_r = \frac{E_r}{BW_r};$$

and storing the energy density of reference signal ($D_r$) in one of a firmware and a program memory.

The measuring step for obtaining an energy density of echo signal ($D_e$) for a wideband echo signal comprises:

coupling the pulse generator and the signal processing unit to an acoustic transducer;

generating a wideband acoustic wave from the acoustic transducer;

obtaining a wideband echo signal $V_e(t)$ after the wideband acoustic wave being reflected from an acoustic mirror;

obtaining a function $\hat{V}_e(f)$ that is a Fourier Transform of the wideband echo signal $V_e(t)$;

obtaining an energy spectrum of wideband echo signal based on the function $\hat{V}_e(f)$;

calculating a bandwidth of echo signal ($BW_e$) at a designated decibel for the energy spectrum of the wideband echo signal;

calculating an energy of echo signal ($E_e$) for the wideband echo signal $V_e(t)$;

calculating an energy density of echo signal ($D_e$) for the wideband echo signal as follows:

$$D_e = \frac{E_e}{BW_e};$$

and storing the energy density of echo signal ($D_e$) in the program memory.

The measuring step for obtaining a characteristic loop sensitivity ($S_{LC}$) for the acoustic transducer comprises:

obtaining an energy density of reference signal ($D_r$) for a wideband reference signal;

obtaining an energy density of echo signal ($D_e$) for a wideband echo signal;

defining a characteristic loop sensitivity ($S_{LC}$) for the acoustic transducer as follows:

$$S_{LC} \stackrel{def}{=} 10 \log\left(\frac{D_e}{D_r}\right);$$

storing the characteristic loop sensitivity ($S_{LC}$) in a storage device; and outputting data stored in the storage device.

Furthermore, a plurality of characteristic loop sensitivity ($S_{LC}$) for each and all acoustic transducers in an acoustic transducer array can be obtained; the measuring step for which comprises:

performing the measuring step for calculating the characteristic loop sensitivity ($S_{LC}$) sequentially or randomly over each and all acoustic transducers in an acoustic transducer array;

obtaining a plurality of characteristic loop sensitivity ($S_{LC}$);

storing the plurality of characteristic loop sensitivity ($S_{LC}$) in the storage device; and outputting data stored in the storage device.

An example of measuring a characteristic loop sensitivity of for an acoustic transducer in an acoustic probe was performed according to the present invention. The measured characteristic loop sensitivity of the given acoustic transducer is −49 dB.

The acoustic transducer under test in the example is in a transducer array of a commercial acoustic probe containing one hundred and ninety-two (192) acoustic transducers. The central frequency and bandwidth of the transducer are 7.3 MHz and 80%, respectively. In the measurement, a negative-going unipolar pulse with an amplitude of −75 volts and an upper bound frequency of 55 MHz was adopted as a wideband reference signal. The distance between the acoustic transducer and acoustic mirror is 20 mm. And, the material of the acoustic mirror is stainless-steel with an acoustic reflection coefficient of 0.93 in a water bath.

Figure 18:
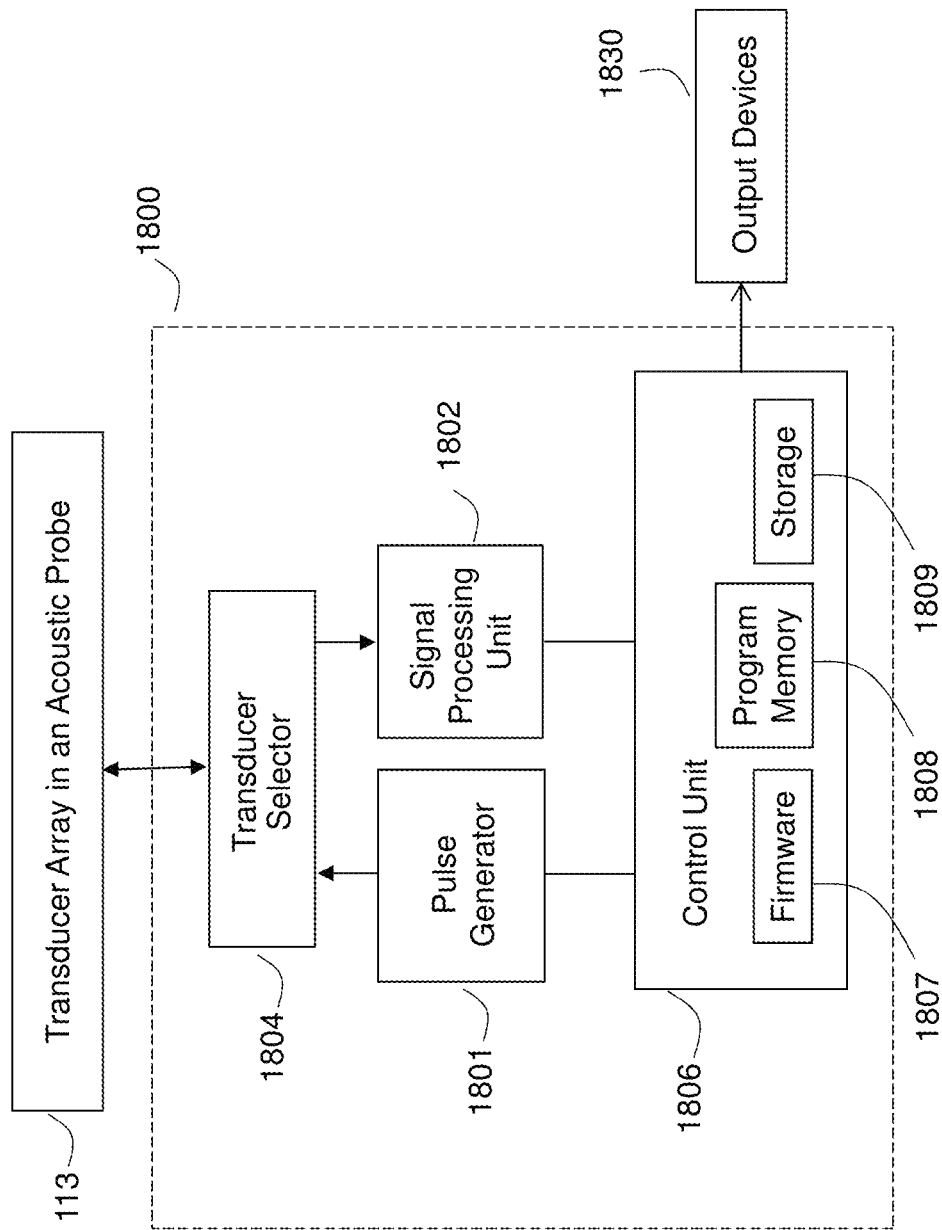
FIG. 18 shows a system for measuring a characteristic loop sensitivity of an acoustic transducer according to the present invention.

FIG. 18 shows a system for measuring a characteristic loop sensitivity of an acoustic transducer according to the present invention. The system 1800 comprises a pulse generator 1801, a signal processing unit 1802, a transducer selector 1804, and a control unit 1806. The control unit 1806 further comprises a firmware 1807, a program memory 1808, and a storage 1809.

The control unit 1806 is electrically coupled to the pulse generator 1801, to the signal processing unit 1802, and to external output devices 1830.

The pulse generator 1801 is electrically coupled to an acoustic transducer through the transducer selector 1804 for generating a pulse to create a wideband acoustic wave from the acoustic transducer. The pulse is one of a unipolar pulse and a bipolar pulse. The unipolar pulse is one of a negative-going pulse 400 and a positive-going pulse 500. The bipolar pulse is one of a negative-positive bipolar pulse 700 and a positive-negative bipolar pulse 800.

The reflected wideband echo wave is received by the acoustic transducer through the transducer selector 1804 to the signal processing unit 1802 for further processing. The transducer selector 1804 sequentially or randomly selects one transducer of a transducer array in an acoustic probe 113.

The measuring method for obtaining an energy density of reference signal ($D_r$) for a wideband reference signal is embedded in one of the firmware 1807 and the program memory 1808 according to the present invention.

The measuring method for obtaining an energy density of echo signal ($D_e$) for a wideband echo signal is embedded in one of the firmware 1807 and the program memory 1808 according to the present invention.

The method for measuring a characteristic loop sensitivity ($S_{LC}$) for the acoustic transducer is embedded in one of the firmware 1807 and the program memory 1808 according to the present invention.

The method for measuring the plurality of characteristic loop sensitivity ($S_{LC}$) for each and all acoustic transducers in an acoustic transducer array is embedded in one of the firmware 1807 and the program memory 1808 according to the present invention.

All data of measurement are stored in the storage 1809 and output to the output devices 1830 according to the present invention.

While several embodiments have been described by way of example, it will be apparent to those skilled in the art that various modifications may be configured without departing from the spirit of the present invention. Such modifications are all within the scope of the present invention, as defined by the appended claims.

Numerical System 113 acoustic probe
117A transducer array
117 acoustic transducer
200 sine burst generator
204 reference signal
208 water bath
212 acoustic mirror
214 transmitted acoustic sine burst wave
218 reflected sine burst wave
224 echo signal
400 wideband reference signal of negative-going unipolar pulse
404 energy spectrum of wideband reference signal of negative-going unipolar pulse
500 wideband reference signal of positive-going unipolar pulse
504 energy spectrum of wideband reference signal of positive-going unipolar pulse
600 frequency response of acoustic transducer
700 wideband reference signal of negative-positive bipolar pulse
704 energy spectrum of wideband reference signal of negative-positive bipolar pulse
800 wideband reference signal of positive-negative bipolar pulse
804 energy spectrum of wideband reference signal of positive-negative bipolar pulse
900 frequency response of acoustic transducer
1000 pulse generator
1004 transmitted wideband acoustic wave
1008 reflected wideband acoustic wave
1100 wideband echo signal based on negative-going unipolar pulse
1200 wideband echo signal based on positive-going unipolar pulse
1300 wideband echo signal based on negative-positive bipolar pulse
1400 wideband echo signal based on positive-negative bipolar pulse
1504 energy spectrum of wideband reference signal
1604 energy spectrum of wideband reference signal
1800 system
1801 pulse generator
1802 signal processing unit
1804 transducer selector
1806 control unit
1807 firmware
1808 program memory
1809 storage
1830 output devices

Notation

Reference Signal

| | |
|---|---|
| $(V_{ppr})$ | peak-to-peak voltage of reference signal |
| $(E_r)$ | energy of reference signal; $E_r = \frac{1}{50}\int V_r(t)^2 dt = \frac{1}{50}\int |\hat{V}_r(f)|^2 df$ |
| $(BW_r)$ | bandwidth of reference signal; |
| $(D_r)$ | energy density of reference signal; $D_r = \frac{E_r}{BW_r}$ |
| $V_r(t)$ | wideband reference signal; |
| $\hat{V}_r(f)$ | Fourier Transform of the wideband reference signal $V_r(t)$; |
| $\frac{1}{50}|\hat{V}_r(f)|^2$ | energy spectrum of wideband reference signal; |

Echo Signal

| | |
|---|---|
| $(V_{ppe})$ | peak-to-peak voltage of echo signal; |
| $(E_e)$ | energy of echo signal; $E_e = \frac{1}{50}\int V_e(t)^2 dt = \frac{1}{50}\int |\hat{V}_e(f)|^2 df$ |
| $(BW_e)$ | bandwidth of echo signal; |
| $(D_e)$ | energy density of echo signal; $D_e = \frac{E_e}{BW_e}$ |
| $V_e(t)$ | wideband echo signal; |
| $\hat{V}_e(f)$ | Fourier Transform of the wideband echo signal $V_e(t)$; |
| $\frac{1}{50}|\hat{V}_e(f)|^2$ | energy spectrum of wideband echo signal; |

Definition

| | |
|---|---|
| $\hat{X}(f)$ | normalized loop frequency response $\hat{X}(f) \stackrel{def}{=} \frac{\hat{V}_e(f)}{\hat{V}_r(f)}; \hat{X}(f) \stackrel{def}{=} \hat{V}_e(f)/V_r(f);$ |
| $X(t)$ | normalized loop time response; Inverse Fourier Transform of the $\hat{X}(f)$ $X(t) \stackrel{def}{=}$ Inverse Fourier Transform of the $\hat{X}(f)$ |

-continued

| | |
|---|---|
| $S_L(f)$ | wideband loop sensitivity is defined as an absolute square of the $\hat{X}(f)$ in decibel; $$S_L(f) \stackrel{def}{=} 10 \log|\hat{X}(f)|^2$$ |
| $(S_{LC})$ | characterisitic loop sensitivity $$S_{LC} \stackrel{def}{=} 10 \log\left(\frac{D_e}{D_r}\right)$$ |
| $G(t)$ | Inverse Fourier Transform of the $\sqrt{\hat{X}(f)}$; $$G(t) = \text{Inverse Fourier Transform of the } \sqrt{\hat{X}(f)}$$ |
| $B(t)$ | self-deconvolution of the X(t); G(t) = Self-deconvolution of the X(t) an optimum drive signal on energy efficiency basis for the acoustic transducer; $$B(t) \stackrel{def}{=} \alpha * G(t),$$ wherein a coefficient α is determined to multiply the function G(t). |

What is claimed is:

1. A method for measuring a characteristic loop sensitivity for an acoustic transducer, the method comprising:
   preparing a pulse generator;
   electrically coupling a predetermined load to the pulse generator;
   generating, by the pulse generator, a pulse to create a wideband signal as a reference signal;
   obtaining a wideband reference signal $V_r(t)$;
   obtaining a function $\hat{V}_r(f)$ that is a Fourier Transform of the wideband reference signal $V_r(t)$;
   obtaining an energy spectrum of wideband reference signal based on the function $\hat{V}_r(f)$;
   calculating a bandwidth of reference signal ($BW_r$) at a designated decibel for the energy spectrum of the wideband reference signal;
   calculating an energy of reference signal ($E_r$) for the wideband reference signal $V_r(t)$;
   calculating an energy density of reference signal ($D_r$) for the wideband reference signal:
   $$D_r = E_r/BW_r;$$
   generating a wideband acoustic wave from the acoustic transducer;
   obtaining a wideband echo signal $V_e(t)$ after the wideband acoustic wave being reflected from an acoustic mirror;
   obtaining a function $\hat{V}_e(f)$ that is a Fourier Transform of the wideband echo signal $V_e(t)$;
   obtaining an energy spectrum of wideband echo signal based on the function $\hat{V}_e(f)$;
   calculating a bandwidth of echo signal ($BW_e$) at a designated decibel for the energy spectrum of wideband echo signal;
   calculating an energy of echo signal ($E_e$) for the wideband echo signal $V_e(t)$;
   calculating an energy density of echo signal ($D_e$) for the wideband echo signal;
   $$D_e = E_e/BW_e;$$
   and
   defining a characteristic loop sensitivity (SLC) for the acoustic transducer:
   $$S_{LC} \stackrel{def}{=} 10 \log\left(\frac{D_e}{D_r}\right).$$

2. The method as claimed in claim 1, wherein the pulse is one of a unipolar pulse and a bipolar pulse.

3. The method as claimed in claim 2, wherein the unipolar pulse is one of a negative-going pulse and a positive-going pulse.

4. The method as claimed in claim 2, wherein the bipolar pulse is a negative-going pulse first and a positive-going pulse second.

5. The method as claimed in claim 2, wherein the bipolar pulse is a positive-going pulse first and a negative-going pulse second.

* * * * *